(12) United States Patent
Nasu et al.

(10) Patent No.: US 11,838,630 B2
(45) Date of Patent: Dec. 5, 2023

(54) IMAGE CAPTURING APPARATUS, CONTROL METHOD THEREFOR, AND STORAGE MEDIUM

(71) Applicant: CANON KABUSHIKI KAISHA, Tokyo (JP)

(72) Inventors: Hitoshi Nasu, Tokyo (JP); Shunichi Wakashima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 17/330,183

(22) Filed: May 25, 2021

(65) Prior Publication Data
US 2021/0385382 A1    Dec. 9, 2021

(30) Foreign Application Priority Data

Jun. 4, 2020 (JP) ................................ 2020-097832
Jul. 31, 2020 (JP) ................................ 2020-130770

(51) Int. Cl.
| | |
|---|---|
| *H04N 23/68* | (2023.01) |
| *H04N 23/61* | (2023.01) |
| *H04N 23/73* | (2023.01) |
| *H04N 23/75* | (2023.01) |
| *H04N 23/667* | (2023.01) |
| *H04N 23/741* | (2023.01) |
| *H04N 23/76* | (2023.01) |

(52) U.S. Cl.
CPC ........... *H04N 23/682* (2023.01); *H04N 23/61* (2023.01); *H04N 23/667* (2023.01); *H04N 23/6811* (2023.01); *H04N 23/6812* (2023.01); *H04N 23/73* (2023.01); *H04N 23/741* (2023.01); *H04N 23/75* (2023.01); *H04N 23/76* (2023.01)

(58) Field of Classification Search
CPC .... H04N 23/61; H04N 23/611; H04N 23/667; H04N 23/72; H04N 23/73; H04N 23/741; H04N 23/75; H04N 23/76
See application file for complete search history.

(56) References Cited

U.S. PATENT DOCUMENTS

| | | | | |
|---|---|---|---|---|
| 2008/0043112 | A1* | 2/2008 | Nikkanen | G03B 7/097 |
| | | | | 348/217.1 |
| 2009/0256921 | A1* | 10/2009 | Pertsel | H04N 23/68 |
| | | | | 348/E5.042 |
| 2020/0348580 | A1* | 11/2020 | Pan | H04N 23/71 |
| 2022/0130057 | A1* | 4/2022 | Nakamura | G06T 7/269 |

FOREIGN PATENT DOCUMENTS

JP         4379918 B2    12/2009

* cited by examiner

*Primary Examiner* — Daniel M Pasiewicz
(74) *Attorney, Agent, or Firm* — CANON U.S.A., INC. IP Division

(57) ABSTRACT

An apparatus includes a capturing device configured to capture an image of a subject; an estimation unit configured to estimate, from the captured image of the subject, a speed of the subject at a time point of image capture of a subsequent image, the estimation being performed using a learned model generated through machine learning, and a control unit configured to, based on the estimated speed of the subject, control an image capturing operation for the image capture of the subsequent image by the capturing device.

39 Claims, 23 Drawing Sheets

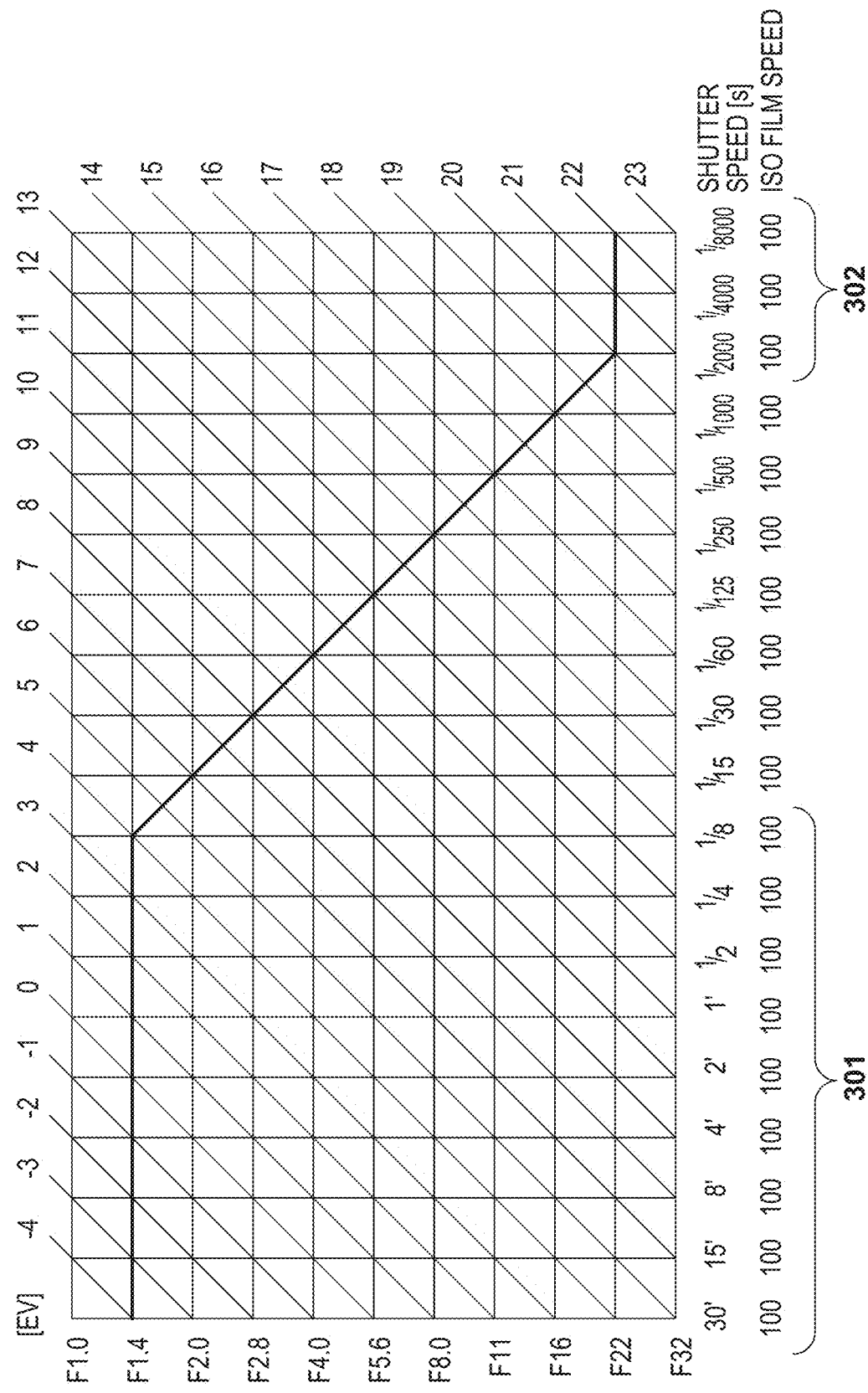

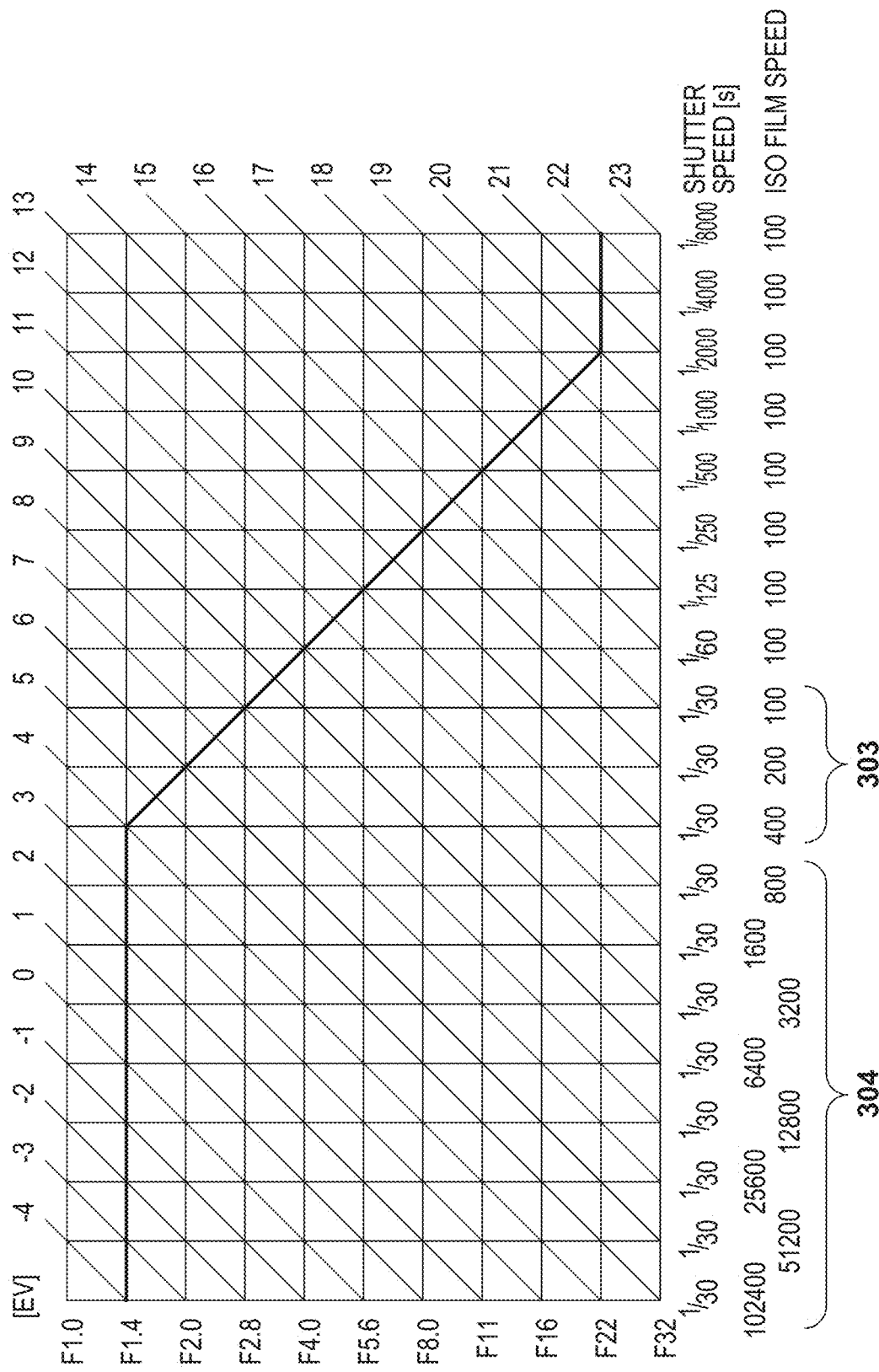

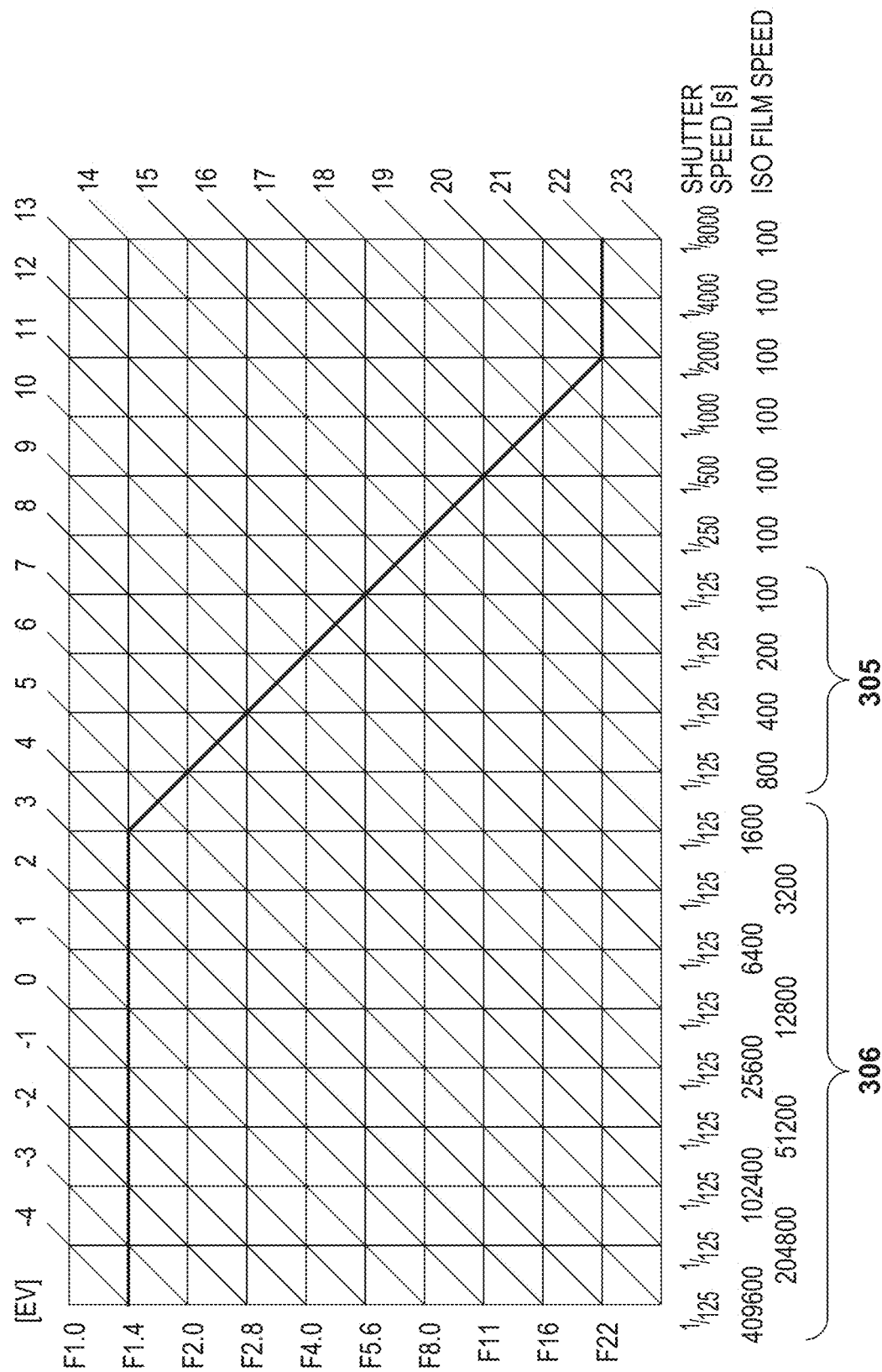

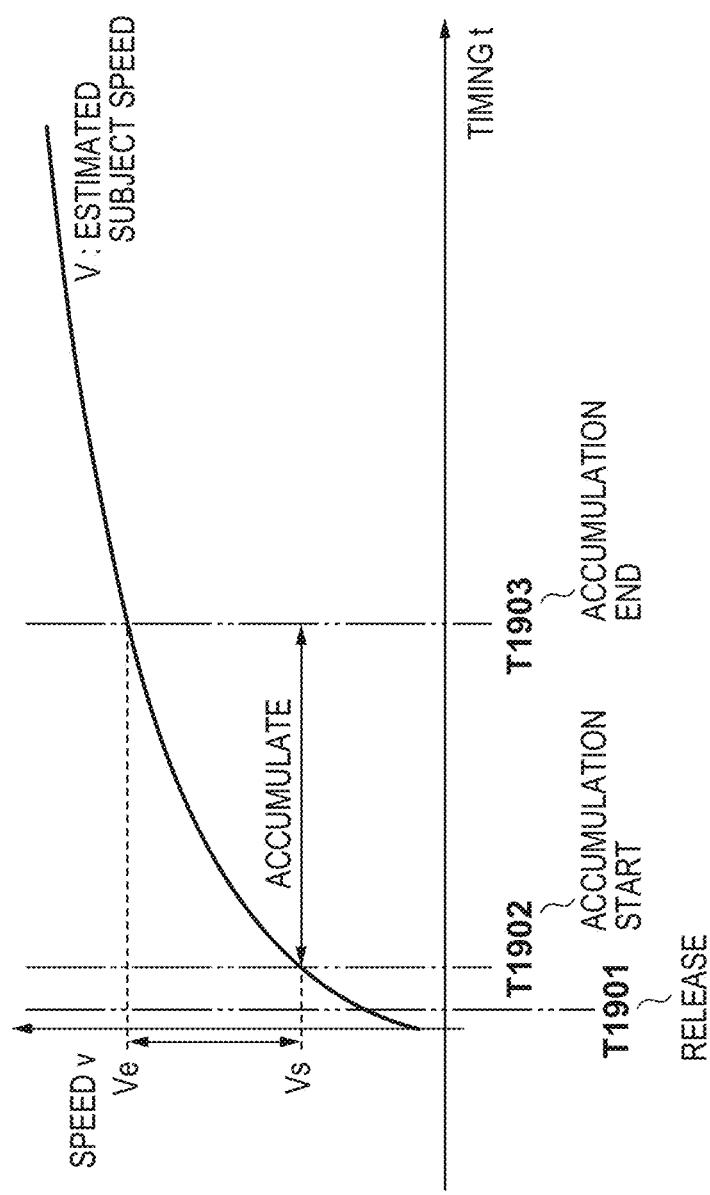

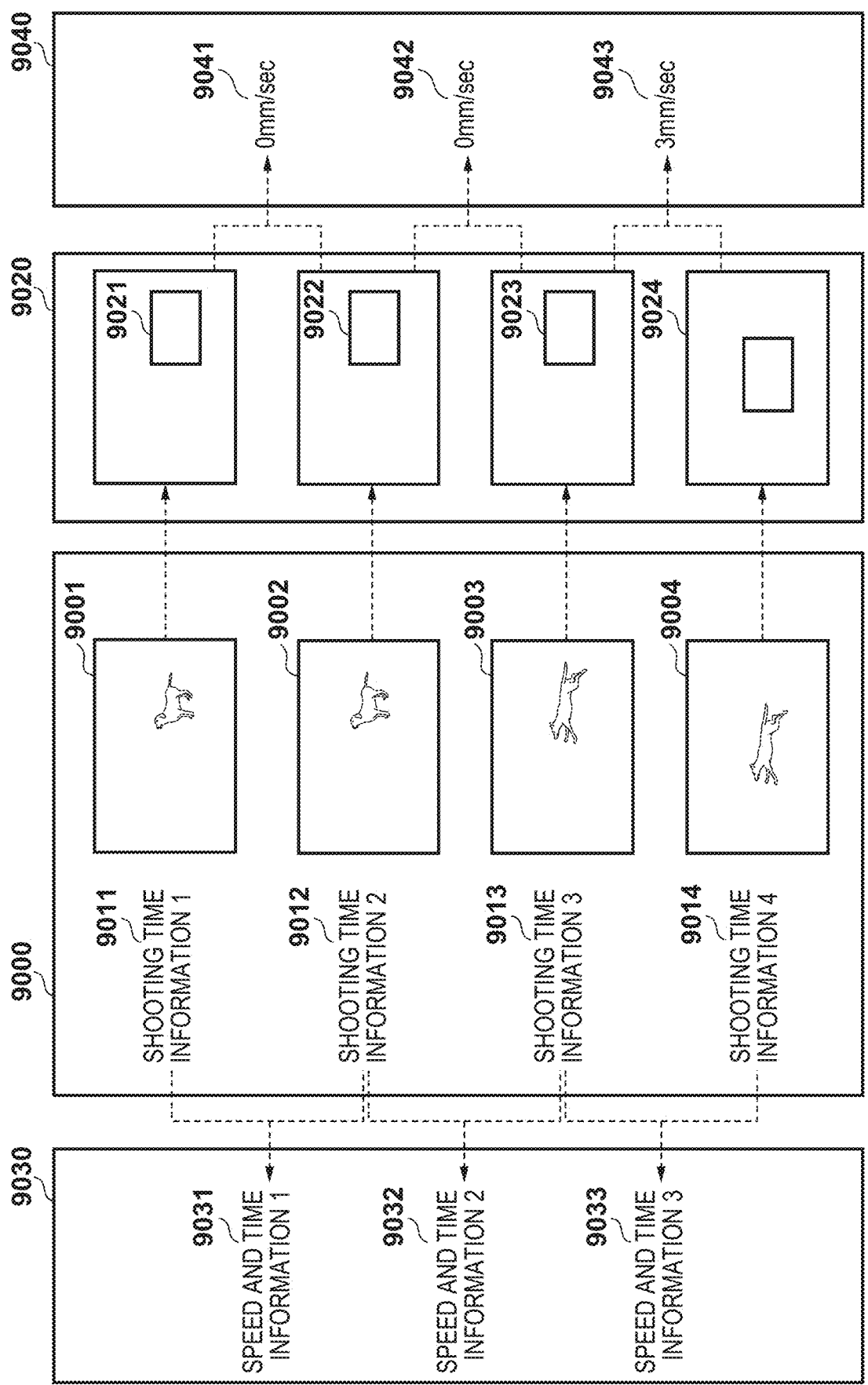

IMAGE CAPTURING APPARATUS, CONTROL METHOD THEREFOR, AND STORAGE MEDIUM

BACKGROUND OF THE DISCLOSURE

Field of the Disclosure

The aspect of the embodiments relates to a technique to suppress subject blur in a case where an image capturing apparatus shoots a moving subject.

Description of the Related Art

Conventionally, an image capturing apparatus is known that performs control to suppress subject blur in deciding on image capturing conditions for a subject.

According to Japanese Patent No. 4379918, motion vectors of a subject and motion vectors of a background are obtained using a plurality of captured images, the motion of the subject and the motion of the image capturing apparatus are obtained respectively from the motion vectors of the subject and the motion vectors of the background, and image capturing conditions are set based on these motions.

However, with the technique disclosed in Japanese Patent No. 4379918 mentioned above, the speed of the subject is obtained from the amount of movement of the subject between a plurality of images. Therefore, for example, in a case where there is a sudden speed change, such as a case where an animal pounces on its prey, it is difficult to accurately obtain such a speed change. In this case, subject blur is beyond the capability to suppress.

SUMMARY OF THE DISCLOSURE

According to a first aspect of the embodiments, there is provided an apparatus, comprising: a capturing device configured to capture an image of a subject; an estimation unit configured to estimate, from the captured image of the subject, a speed of the subject at a time point of image capture of a subsequent image, the estimation being performed using a learned model generated through machine learning, and a control unit configured to, based on the estimated speed of the subject, control a capturing operation for the image capture of the subsequent image by the capturing device.

According to a second aspect of the embodiments, there is provided a method of controlling an apparatus including a capturing device that captures an image of a subject, the method comprising: estimating, with use of a learned model generated through machine learning, from the image of the captured subject, a speed of the subject at a time point of image capture of a subsequent image; and based on the estimated speed of the subject, controlling a capturing operation for the image capture of the subsequent image by the capturing device.

Further features of the disclosure will become apparent from the following description of exemplary embodiments with reference to the attached drawings.

BRIEF DESCRIPTION OF THE DRAWINGS

FIGS. 4A to 4D are diagrams showing examples of program line charts corresponding to the moving speeds of a subject.

FIGS. 19A, 19B are diagrams showing control of an accumulation period based on the subject speed at the time of the start of accumulation.

FIG. 22 is a diagram schematically illustrating learning of a learned model in the sixth embodiment.

DESCRIPTION OF THE EMBODIMENTS

Figure 1:
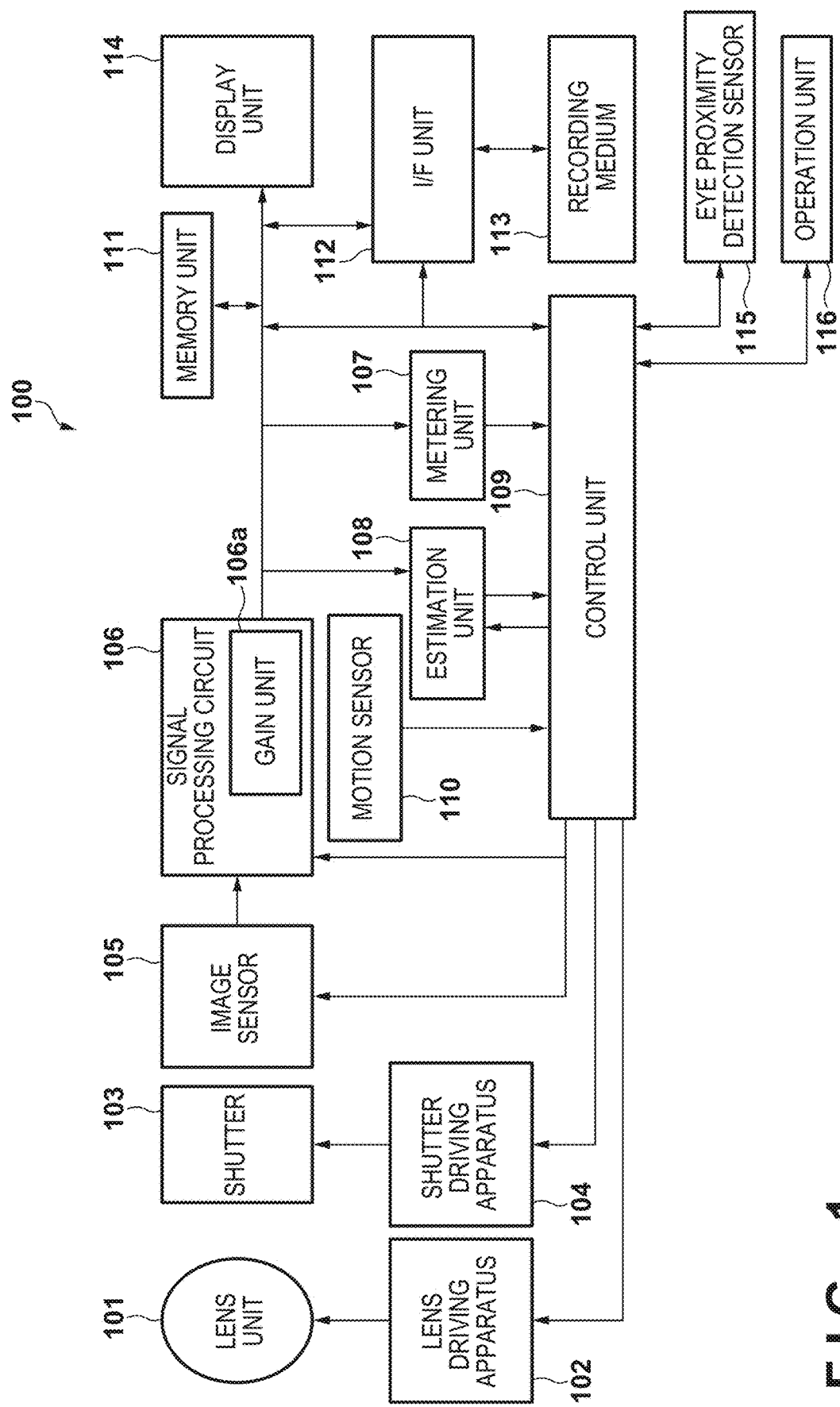
FIG. 1 is a block diagram showing a configuration of a digital camera, which is a first embodiment of an image capturing apparatus of the disclosure.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing a configuration of a digital camera 100, which is a first embodiment of an image capturing apparatus of the disclosure.

In FIG. 1, a lens unit 101 forms an optical image of a subject on an image sensor 105. Also, zoom control, focus control, diaphragm control, and the like for the lens unit 101 are performed by the lens driving apparatus 102. A mechanical shutter 103 is controlled by a shutter driving apparatus 104. The image sensor 105 is composed of, for example, a CCD or CMOS sensor, photoelectrically converts the subject image formed by the lens unit 101, and outputs image signals.

A signal processing circuit 106 performs various types of correction processing, data compression processing, development processing, and the like with respect to the image signals output from the image sensor 105. The signal processing circuit 106 also includes a gain unit 106a that performs digital gain processing for applying a gain to the image signals. A metering unit 107 obtains subject luminance from the image signals. Based on the image signals, an estimation unit 108 estimates and learns the speed of the subject at the time of image capture of the subject (the time after the elapse of a predetermined period from current time).

A control unit 109 performs various types of computations, and also controls the entirety of the digital camera 100. A motion sensor 110 includes an angular velocity sensor (gyroscope) that detects the angular velocity of a motion of the digital camera 100, and an acceleration sensor that detects acceleration thereof. A memory unit 111 temporarily stores image data. An interface unit (I/F unit) 112 is an interface for recording data to a recording medium 113, or reading out data from the recording medium 113. The recording medium 113 is composed of, for example, an attachable/removable semiconductor memory for recording or readout of image data.

A display unit 114 is a display unit that displays various types of information and shot images, and includes an electronic viewfinder (EVF) and a liquid crystal display unit (LCD). The electronic viewfinder is provided with an eye proximity unit, and images displayed on an EVF panel can be visually confirmed via the eye proximity unit. A proximity sensor 115 is placed in the vicinity of the eye proximity unit of the EVF, and detects an object that is in proximity to the eye proximity unit.

An operation unit 116 includes a power switch, a shutter switch, and a touchscreen. The shutter switch includes an instruction switch SW1 that starts a shooting preparation operation, such as autofocus (AF), when a shutter button has been depressed halfway, and an instruction switch SW2 that starts image capture when the shutter button has been fully depressed. The touchscreen is laid on the LCD, and detects a touch operation performed by a user.

Figure 2:
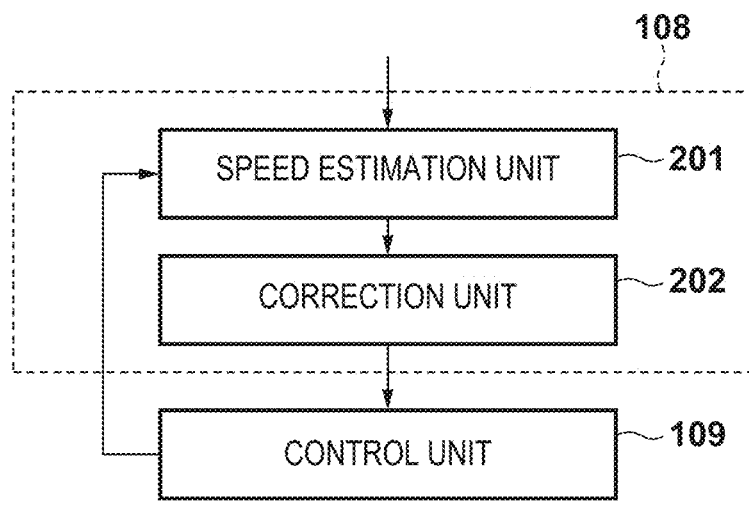
FIG. 2 is a diagram showing a block configuration of an estimation unit.

FIG. 2 is a diagram showing a block configuration of the estimation unit 108. The estimation unit 108 is configured to include a speed estimation unit 201 and a correction unit 202. With respect to an input image signal of one image held in the memory unit 111, the speed estimation unit 201 estimates and outputs the speed that a subject within the image signal will have at a time point of image capture of a recording image that will take place after a predetermined period. The control unit 109 gives notification of the timing of image capture that will take place after a predetermined period.

This estimation of the speed of the subject can be realized by performing machine learning based on the association between a subject within an input image and the speed of the next action of this subject with use of, for example, known deep learning techniques, and by using a learned model that has been generated. Therefore, even if there has been a sudden change in a motion, the speed can be estimated by using an input image that shows a sign of such a sudden change in the motion in advance.

Figure 3A:
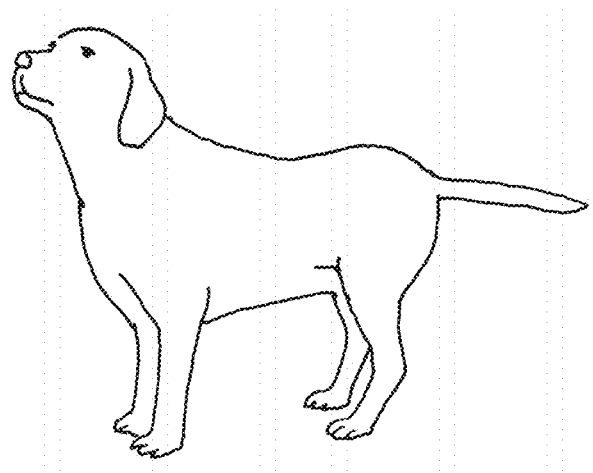
FIGS. 3A, 3B are diagrams showing examples of images input to the estimation unit.
Figure 3B:
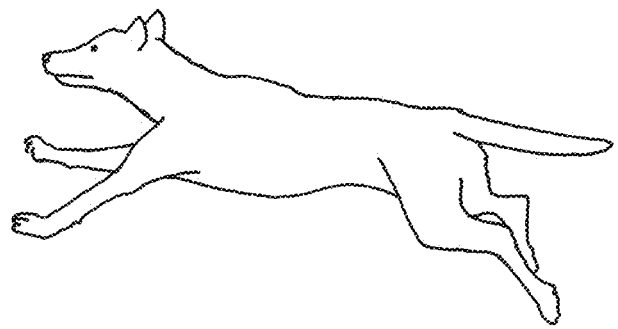

FIGS. 3A, 3B are diagrams showing examples of images input to the estimation unit 201. In a case where an image of a standing dog shown in FIG. 3A has been input to the speed estimation unit 201, the speed estimation unit 201 outputs an estimated speed of 0 km/h. In a case where an image of a running dog shown in FIG. 3B has been input to the speed estimation unit 201, the speed estimation unit 201 outputs, for example, an estimated speed of 30 km/h.

The correction unit 202 corrects the estimated speed output from the speed estimation unit 201 in accordance with the size of the subject in the input image on an image surface. Specifically, when the size of the subject on the image surface is small, the correction is made so that the speed on the image surface decreases; conversely, when the size is large, the correction is made so that the speed on the image surface increases. Also, the correction unit 202 may correct the estimated speed output from the speed estimation unit 201 with use of the distance to the subject and the image capture magnification factor of the lens unit 101, instead of the size of the subject on the image surface.

The correction unit 202 transmits the corrected estimated speed of the subject to the control unit 109. The control unit 109 selects a corresponding program line chart in accordance with the estimated speed of the subject, and decides on such image capturing conditions as the shutter speed, ISO film speed, and diaphragm based on an EV value (exposure value) obtained by the metering unit 107. The control unit 109 determines the type of the movement, namely motionless, low speed, intermediate speed, or high speed, based on the aforementioned estimated speed of the subject. Here, the subject is treated as a motionless subject when the estimated speed of the subject is lower than a threshold.

Figure 4D:
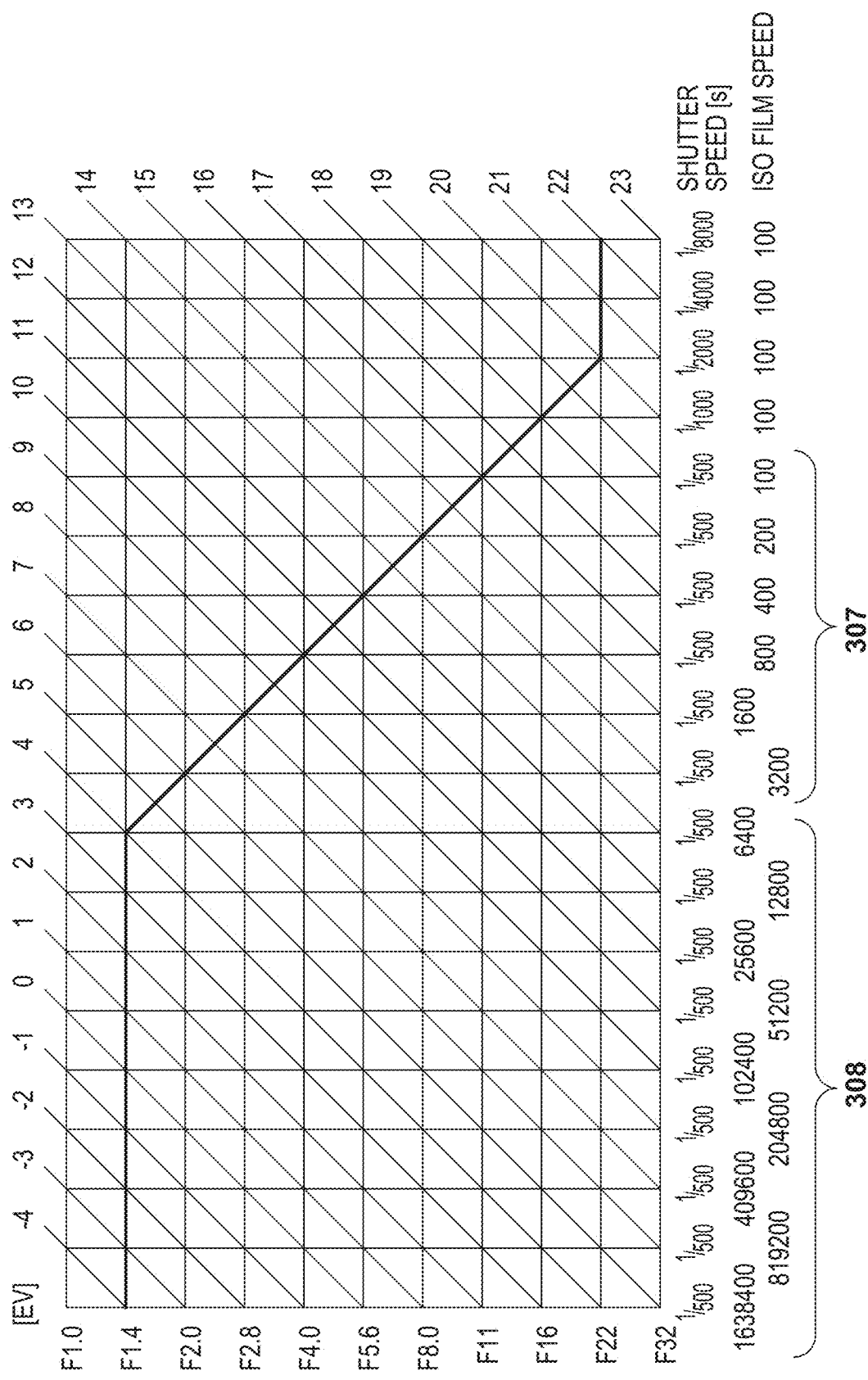

FIGS. 4A to 4D are diagrams showing program line charts for respective types of movement. FIG. 4A shows an example of a program line chart for a motionless subject, FIG. 4B shows an example of a program line chart for a low-speed moving subject, FIG. 4C shows an example of a program line chart for an intermediate-speed moving subject, and FIG. 4D shows an example of a program line chart for a high-speed moving subject. In any program line chart, the maximum diaphragm (the diaphragm with the largest aperture diameter) is F 1.4, and the minimum diaphragm (the diaphragm with the smallest aperture diameter) is F 22. The ISO film speed can be set within a range of ISO100 to ISO1638400 by applying a gain corresponding to the ISO film speed in the gain unit 106a. Furthermore, a gain may be applied within the image sensor 105.

When the subject has been categorized as a motionless subject, the program line chart for the motionless subject of FIG. 4A is selected. With the program line chart for the motionless subject of FIG. 4A, the diaphragm and the shutter speed are controlled in accordance with an EV value measured by the metering unit 107 within a predetermined luminance range (from EV 4 to EV 20 in the figure). In a region 301 with the maximum diaphragm and a region 302 with the minimum diaphragm, control is performed based on the shutter speed.

When the subject has been categorized as a low-speed moving subject, the program line chart for the low-speed moving subject of FIG. 4B is selected because subject blur is caused if an extremely low shutter speed is set. With the program line chart for the low-speed moving subject of FIG. 4B, similarly to the program line chart for the motionless subject, the ISO film speed is fixed and the diaphragm and the shutter speed are controlled within a predetermined luminance range (from EV 8 to EV 20 in the figure). The program line chart for the low-speed moving subject differs from the program line chart for the motionless subject in that, in a region 303 with a shutter speed of $\frac{1}{30}$ seconds, the shutter speed is fixed and the diaphragm and the ISO film speed are controlled. In a region 304 with the maximum diaphragm, the ISO film speed is controlled.

When the subject has been categorized as an intermediate-speed moving subject, the shutter speed is further increased to prevent subject blur, and the program line chart for the intermediate-speed moving subject of FIG. 4C is selected. With the program line chart for the intermediate-speed moving subject of FIG. 4C, similarly to the program line chart for the low-speed moving subject, the ISO film speed is fixed and the diaphragm and the shutter speed are controlled within a predetermined luminance range (from EV 12 to EV 20 in the figure). In a region 305 with a shutter speed of $\frac{1}{125}$ seconds, the shutter speed is fixed and the diaphragm and the ISO film speed are controlled. In a region 306 with the maximum diaphragm, only the ISO film speed is controlled.

When the subject has been categorized as a high-speed moving subject, the shutter speed is further increased to prevent subject blur, and the program line chart for the high-speed moving subject of FIG. 4D is selected. With the program line chart for the high-speed moving subject of FIG. 4D, similarly to the program line chart for the low-speed moving subject, the ISO film speed is fixed and the diaphragm and the shutter speed are controlled within a predetermined luminance range (from EV 16 to EV 20 in the figure). In a region 307 with a shutter speed of $\frac{1}{500}$ seconds, the shutter speed is fixed and the diaphragm and the ISO film speed are controlled. In a region 308 with the maximum diaphragm, only the ISO film speed is controlled.

The following describes the operations of so-called live-view shooting whereby still image shooting is performed while displaying images output from the image sensor 105 on the display unit 114 in a P (program) mode, in which the digital camera 100 itself decides on such image capturing conditions as the shutter speed, ISO film speed, and diaphragm.

In the present embodiment, the estimation unit 108 estimates the speed of the subject with use of a preliminary shot image during live-view shooting, and the control unit 109 switches between the program line charts, based on which the image capturing conditions are decided on, in accordance with the estimated speed.

Figure 5:
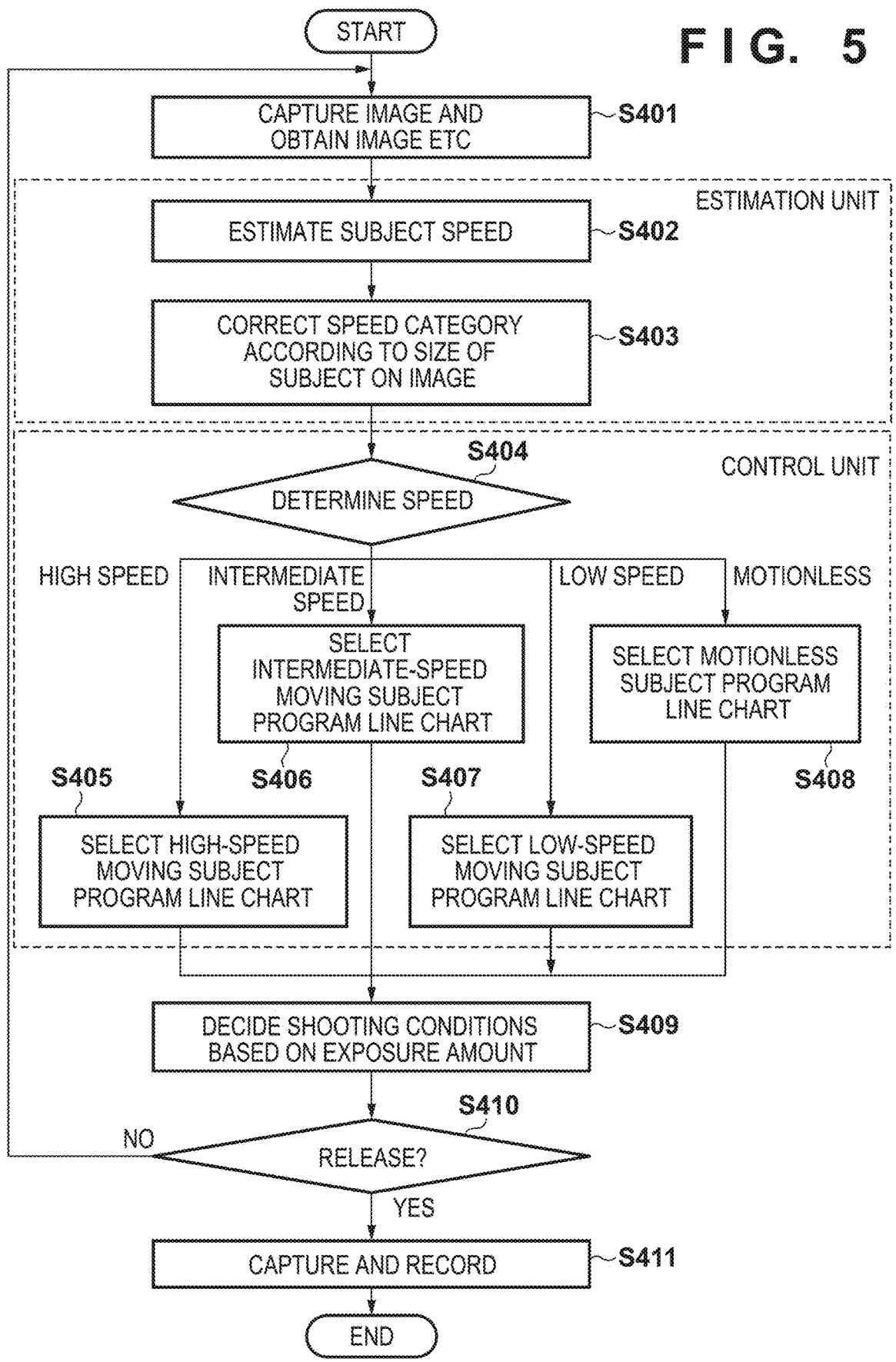
FIG. 5 is a flowchart showing the operations of switching between the program line charts based on the speed of the subject in the first embodiment.

FIG. 5 is a flowchart showing the operations of switching between the program line charts in accordance with the estimated speed of a subject. Once the power of the digital camera 100 has been turned ON, the operations of this flowchart are started, and live-view shooting is started.

In step S401, using the signal processing circuit 106, the control unit 109 performs image processing, such as various types of correction processing, data compression processing, and development processing, with respect to image signals output from the image sensor 105. Processed image data is held in the memory unit 111, and then displayed on the display unit 114. At this time, the image signals output from the image sensor 105 may be resized in the signal processing circuit 106 as they are used in the estimation of the subject speed in the estimation unit 108 and in display performed by the display unit 114. Furthermore, images that have undergone different types of image processing may be discretely input to the display unit 114 and the estimation unit 108, respectively.

In step S402, with respect to one image held in the memory unit 111, the control unit 109 estimates the speed of the subject after a predetermined period with use of the speed estimation unit 201. The predetermined period mentioned here denotes a period until the time of image capture of the next frame in live-view shooting (live-view operation).

In step S403, using the correction unit 202, the control unit 109 corrects the estimated speed of the subject in accordance with the size of the subject on the image surface.

In step S404, the control unit 109 categorizes the subject as high speed, intermediate speed, low speed, or motionless based on the estimated speed of the subject corrected by the correction unit 202. The operations proceed to step S405, step S406, step S407, and step S408 when the subject is a high-speed moving subject, an intermediate-speed moving subject, a low-speed moving subject, and a motionless subject, respectively. In steps S405, S406, S407, and S408, the control unit 109 selects a program line chart corresponding to each subject speed (controls an image capturing operation).

In step S409, the control unit 109 decides on such image capturing conditions as the shutter speed, ISO film speed, and diaphragm based on the selected program line chart and an EV value obtained by the metering unit 107.

In step S410, the control unit 109 determines whether a release button has been depressed. When the release button has been depressed, the operations proceed to step S411, and image capturing for recording is performed under the image capturing conditions that were decided on in step S409. The captured image signals are held in the memory unit 111 after the signal processing circuit 106 has applied signal processing thereto, and recorded to the recording medium 113 via the I/F unit 112. When the release button has not been depressed in step S410, the operations return to step S401, and the sequence of operations are repeated.

Note that when the frame rate of live view is high and an inter-frame period is short, processing for estimating the subject speed may not be completed until the next frame in live view. In this case, the estimation processing may be performed once every few frames, and the timing of the subject speed to be estimated may be the time of image capture of the next or subsequent frame.

While the foregoing has described the live-view shooting operations for a case where the shooting mode is the P mode, the foregoing description is also applicable to an Av (diaphragm priority) mode in which a photographer arbitrarily sets the diaphragm, and a Tv (shutter speed priority) mode in which the photographer arbitrarily sets the shutter speed. In the P mode, a program line chart with which the shutter speed is restricted so as not to set a shutter speed that causes subject blur is selected based on the estimated speed of the subject output from the estimation unit 108.

In contrast, in the Tv mode, the shutter speed can be arbitrarily set. In this case, in the Tv mode, no restriction may be placed on the shutter speeds that can be selected by the photographer, and in a case where a shutter speed that causes subject blur has been set, the display unit 114 may display a notification indicating the possibility of the occurrence of subject blur. Furthermore, restrictions may be placed so that a shutter speed that causes subject blur is not settable.

As described above, according to the present embodiment, the subject speed at the time of image capture that will take place after a predetermined period is estimated, and a program line chart corresponding to this speed is selected; as a result, image capturing conditions that are not likely to cause subject blur can be set.

Next, a description is given of a case where information of the motion sensor 110, which includes the angular velocity sensor and the acceleration sensor, is referred to in setting image capturing conditions as an exemplary modification of the first embodiment.

Figure 6:
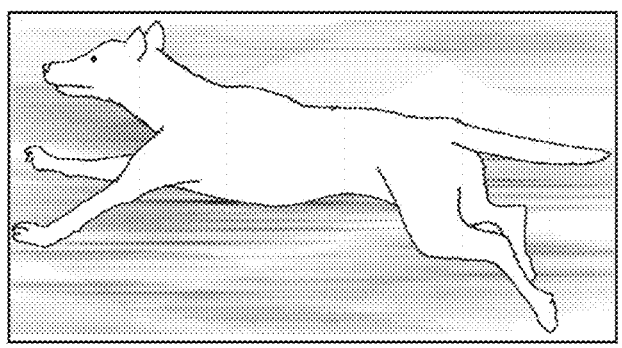
FIG. 6 is a diagram showing an example of a follow shot.

For example, in a case where a running dog is shot through a follow shot, according to the flowchart of the first embodiment, control is performed so that the shutter speed does not become slow. However, in the case of the follow shot, a subject is not to be moved on the image surface, and in addition, a background is to appear to be in motion, as shown in FIG. 6. Therefore, an excessively high shutter speed is not favorable. That is to say, even when a moving subject has been detected, the program line chart for the moving subject is not be selected. In view of this, in the present exemplary modification, in the case of the follow shot, whether the follow shot is performed is determined by detecting, with use of the motion sensor 110, the motion of the digital camera 100 tracking a subject.

Figure 7:
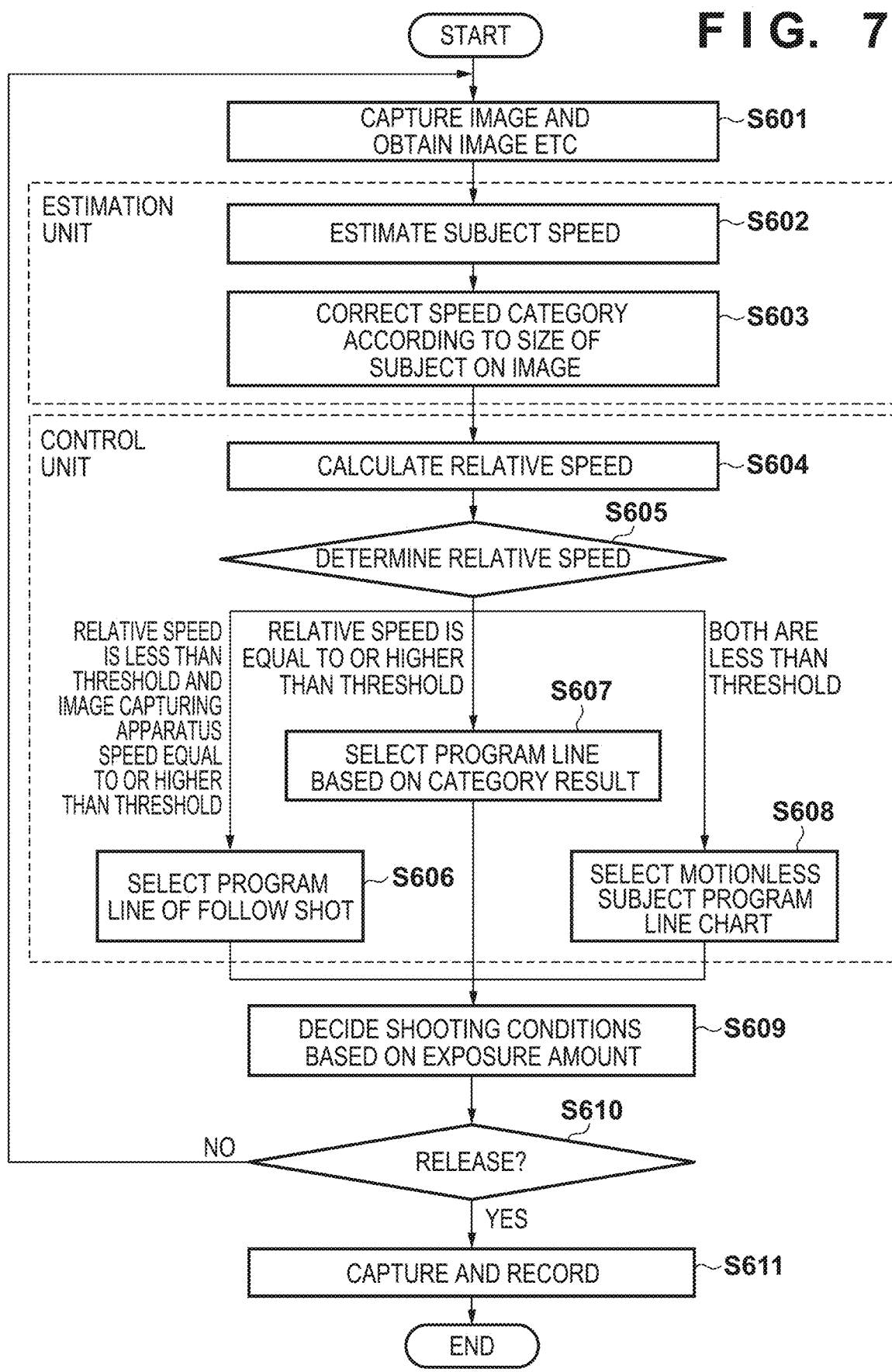
FIG. 7 is a flowchart showing the operations of switching between the program line charts at the time of the follow shot in the first embodiment.

FIG. 7 is a flowchart showing the operations of the digital camera 100, including the determination about the follow shot. Steps S601 to S603 and steps S609 to S611 are similar to steps S401 to S403 and steps S409 to S411 of FIG. 5, respectively, and thus a description thereof is omitted.

In step S604, the control unit 109 refers to speed information of the subject estimated in step S602, as well as angular velocity information and acceleration information from the motion sensor 110, and calculates the speed of the digital camera 100 and the relative speed of the subject and the digital camera 100.

In step S605, the control unit 109 determines whether a follow shot has been performed from the speed of the digital camera 100 and the relative speed of the subject and the digital camera 100 that were calculated in step S604. For example, when the relative speed is lower than a threshold and the speed of the digital camera 100 detected by the motion sensor 110 is equal to or higher than the threshold, it can be determined that the follow shot, in which the digital camera 100 tracks the subject, has been performed. In this case, the control unit 109 selects a program line chart for the follow shot in step S606.

When the relative speed is equal to or higher than the threshold, there is a possibility of the occurrence of subject blur, or image blur caused by a camera shake, and thus the program line chart for the moving subject is selected in step S607 based on the category of the subject speed determined in steps S602, S603. These operations are similar to the operations of steps S404 to S407 in FIG. 5. When both of the relative speed and the speed of the digital camera 100 are lower than the threshold, neither subject blur nor image blur caused by a camera shake are likely to occur, and thus the control unit 109 selects the program line chart for the motionless subject in step S608.

Figure 8:
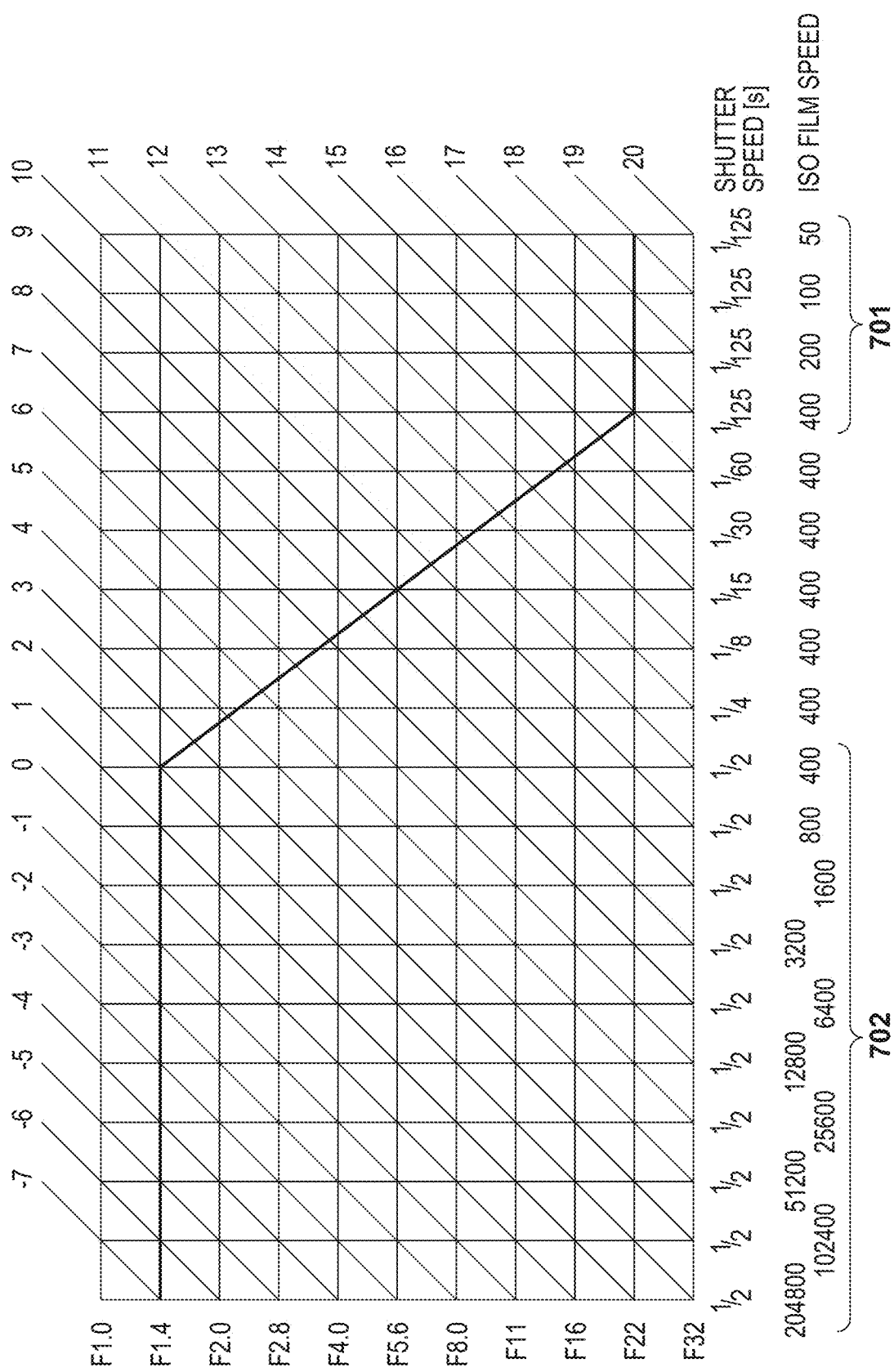
FIG. 8 is a program line chart for the case of the follow shot in the first embodiment.

FIG. 8 is a diagram showing the program line chart for the follow shot. With the program line chart for the follow shot, the ISO film speed is fixed and the diaphragm and the shutter speed are controlled within a predetermined luminance range (from EV 2 to EV 16 in the figure). As a background does not appear to be in motion at a high shutter speed, the shutter speed is fixed and the ISO film speed is controlled in a region 701 with a shutter speed of 1/125 seconds and the minimum diaphragm.

On the other hand, as image blur occurs due to a camera shake during panning in the follow shot at a low shutter speed, the shutter speed is fixed and the ISO film speed is controlled in a region 702 with a shutter speed of 1/2 seconds and the maximum diaphragm.

As described above, according to the exemplary modification of the first embodiment, even when a moving subject has been detected while a follow shot is performed, the program line chart for the follow shot can be selected, and an image in which a background is in motion against the subject can be obtained.

Second Embodiment

While the first embodiment has been described in relation to image capturing conditions at the time of shooting that uses live view, the present embodiment will be described in relation to the operations of live view itself. Live-view shooting denotes the operations for performing still image shooting while displaying images output from the image sensor 105 on the display unit 114.

In a case where a moving subject is shot using live view, when the output from the image sensor 105 has a low frame rate, the display unit 114 displays a motion of a subject in the style of frame-by-frame playback. Therefore, in one embodiment, the frame rate of the output from the image sensor 105 is to be a high frame rate that enables smooth display of a moving subject.

However, when the image sensor 105 outputs image signals at a high frame rate, the electricity consumed by the digital camera 100 increases. In view of this, in a case where a motionless subject is shot in live-view shooting, the frame rate of the output from the image sensor is to be a low frame rate.

Figure 9:
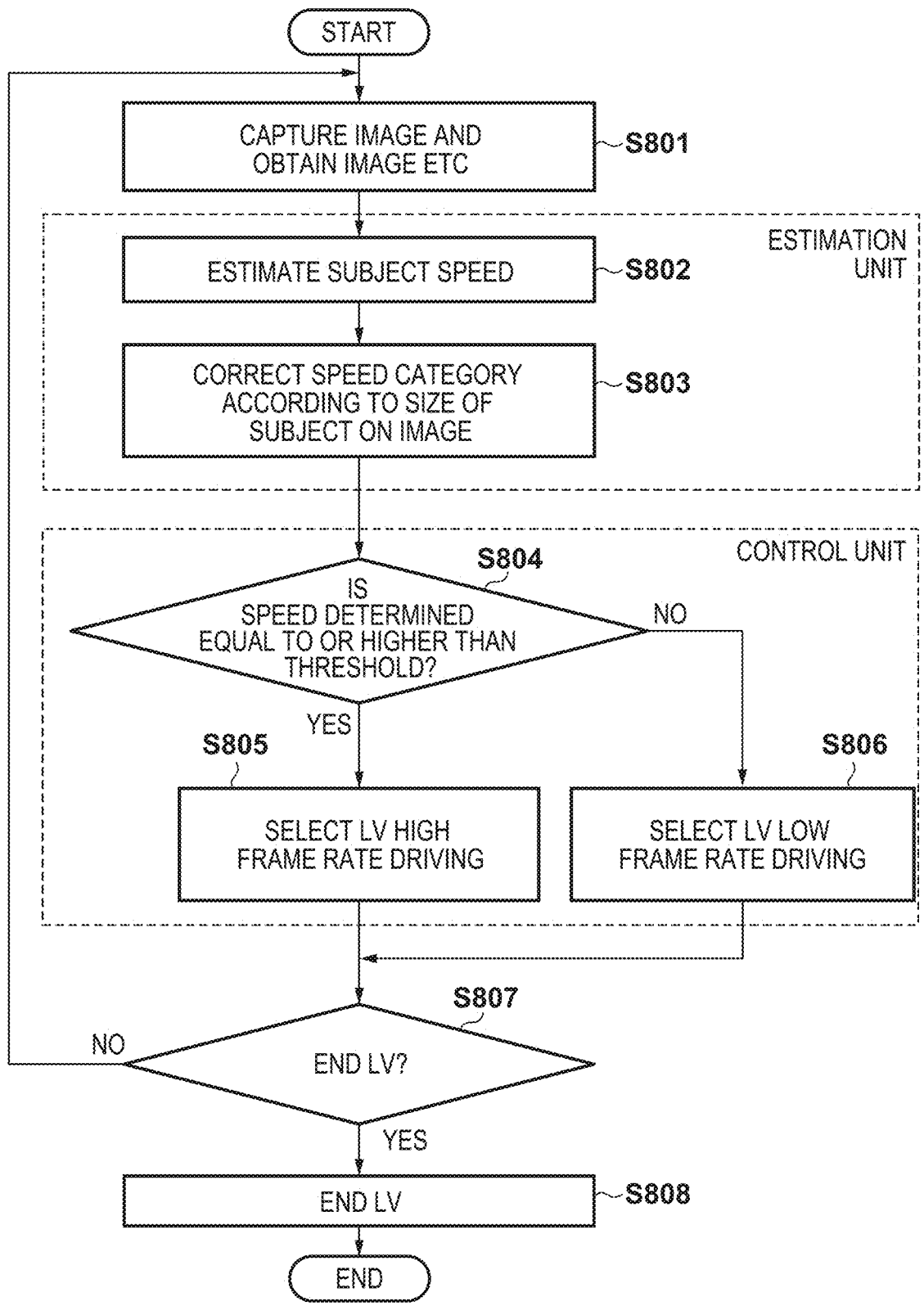
FIG. 9 is a flowchart showing the operations of switching between frame rates of live view in a second embodiment.

FIG. 9 is a flowchart showing the operations of switching between the frame rates of live view in accordance with the estimated speed of a subject. As steps S801 to S803 are similar to steps S401 to S403 of FIG. 5, a description thereof is omitted.

In step S804, the control unit 109 determines whether the estimated speed of the subject is equal to or higher than a predetermined threshold. When the estimated speed of the subject is equal to or higher than the threshold, the operations proceed to step S805, and a driving operation for a high frame rate of live view is selected. When the estimated speed of the subject is lower than the threshold, the operations proceed to step S806, and a driving operation for a low frame rate of live view is selected.

In step S807, the control unit 109 determines whether an operation of ending live view has been performed. When the operation of ending live view has been performed, live view is ended in step S808. When the operation of ending live view has not been performed in step S807, the operations return to step S801, and the sequence of operations is repeated.

As described above, according to the present embodiment, smooth display can be performed at a high frame rate in a case where a moving subject exists in live view, and the consumed electricity can be suppressed by using a low frame rate in the case of a motionless subject.

Note that although the present embodiment has been described using a case where there are two types of frame rates, namely high and low frame rates, there may be a plurality of frame rates and one of them may be selectable in accordance with the estimated speed of the subject.

Third Embodiment

The following describes a third embodiment. The present embodiment will be described in relation to switching between driving methods for an image sensor for a case where an HDR signal (high-dynamic-range signal), which is a composite of low-exposure and high-exposure image signals, is obtained.

First, a pixel structure of an image sensor that can obtain an HDR signal will be described. A structure in which two neighboring pixels have color filters of the same color is known as a pixel structure that can obtain an HDR signal. In this pixel structure, the methods of obtaining an HDR image include a cumulative period switching method in which two neighboring pixels of the same color have different accumulation periods from each other, and a gain switching method in which the two neighboring pixels have different gains from each other.

Figure 10:
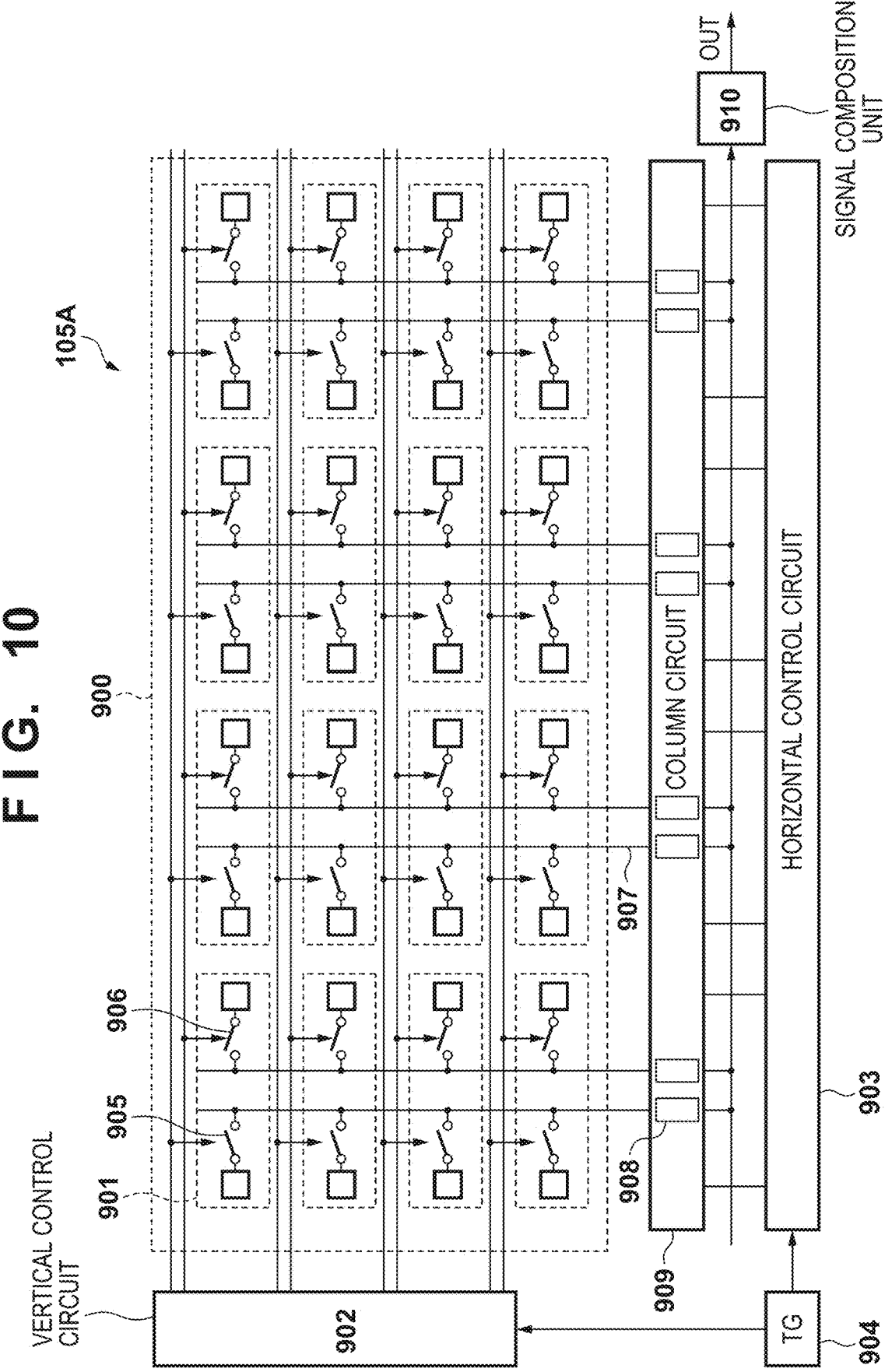
FIG. 10 is a diagram showing a structure of an image sensor in a third embodiment.

FIG. 10 is a diagram showing a structure of an image sensor 105A of the present embodiment. The image sensor 105A is configured to include a pixel region 900, a vertical control circuit 902, a horizontal control circuit 903, a timing generator (hereinafter TG) 904, row selection switches 905, 906, vertical transfer lines 907, a column circuit 909, and a signal addition unit 910.

In the pixel region 900, unit pixels 901 are arranged in a matrix. As stated earlier, a unit pixel 901 is composed of two neighboring pixels that have color filters of the same color. Therefore, two vertical transfer lines 907 are connected to a unit pixel 901. Furthermore, one unit column circuit 908 is connected to one vertical transfer line 907.

Although FIG. 10 illustrates an example in which 4×4 unit pixels 901 are shown in the pixel region 900 to provide the description in an easy-to-understand manner, a larger number of pixels are placed in practice. Note that the vertical control circuit 902 selects pixels in the pixel region 900 on a row-by-row basis with use of the row selection switches 905, 906. Pixel signals that have been read out from the unit pixels 901 via the vertical transfer lines 907 are converted into digital signals in the column circuit 909, which is composed of the plurality of unit column circuits 908, and input to the signal composition unit 910.

The signal composition unit 910 generates an HDR signal by compositing a low-exposure signal and a high-exposure signal that have been read out from two neighboring pixels which are included in a unit pixel 901 and which have color filters of the same color. Composition methods include, for example, a method of generating an HDR signal by using a low-exposure signal in a case where a high-exposure signal is saturated. Note that any composition method can be used as a method of generating an HDR signal, and a composition method is not limited in any way.

The TG 904 transmits, to the vertical control circuit 902 and the horizontal control circuit 903, a control signal for outputting a pixel signal of each signal. Note that the TG 904 transmits a control signal also to the signal composition unit 910.

Figure 11:
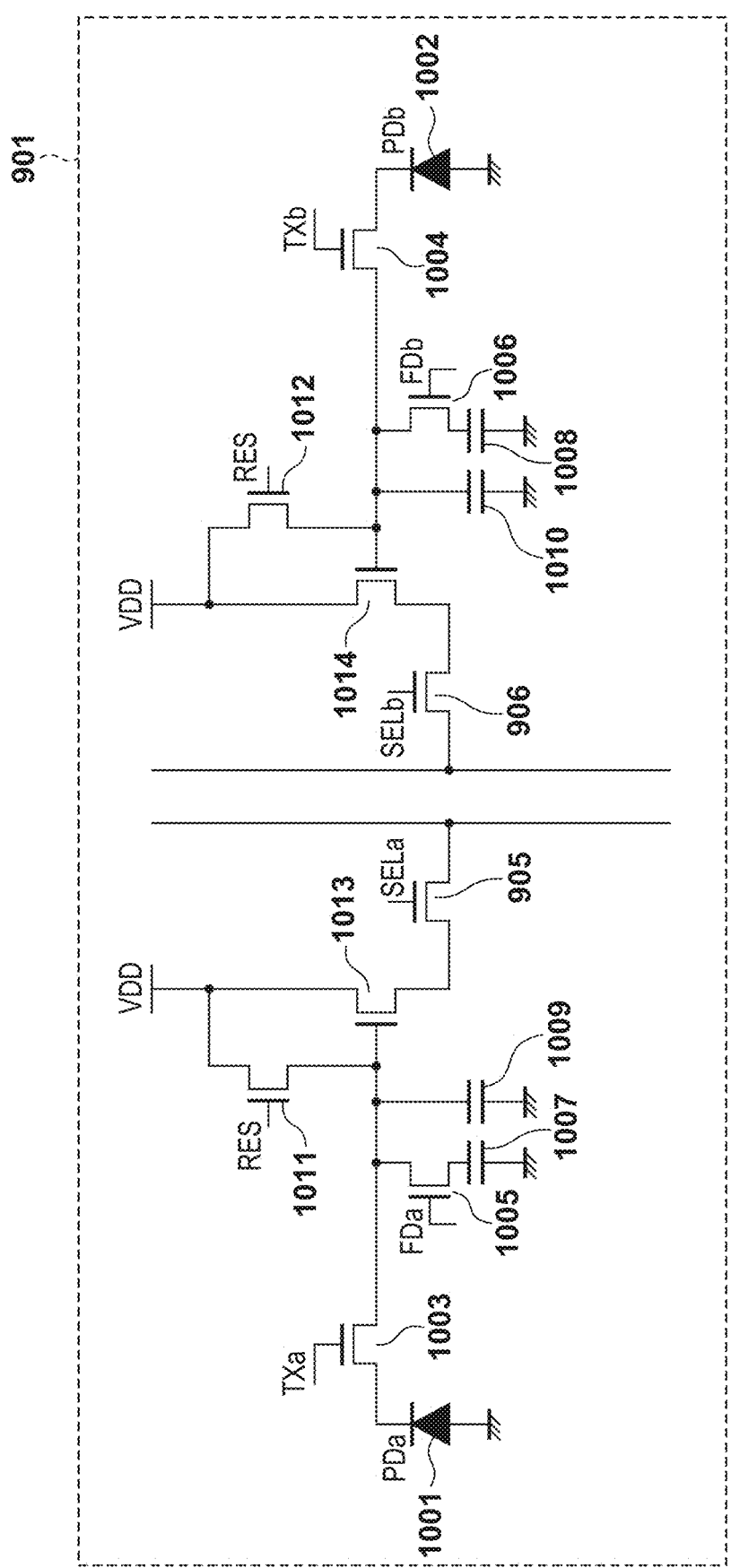
FIG. 11 is a circuit diagram of a unit pixel in the third embodiment.

FIG. 11 is a diagram showing a structure of a unit pixel 901 that includes color filters of the same color. The unit pixel 901 is configured to include photodiodes 1001 (PDa), 1002 (PDb), transfer transistors 1003, 1004, FD capacity addition switches 1005, 1006, additional FD capacities 1007, 1008, FDs 1009, 1010, reset transistors 1011, 1012, and amplification transistors 1013, 1014.

Figure 12:
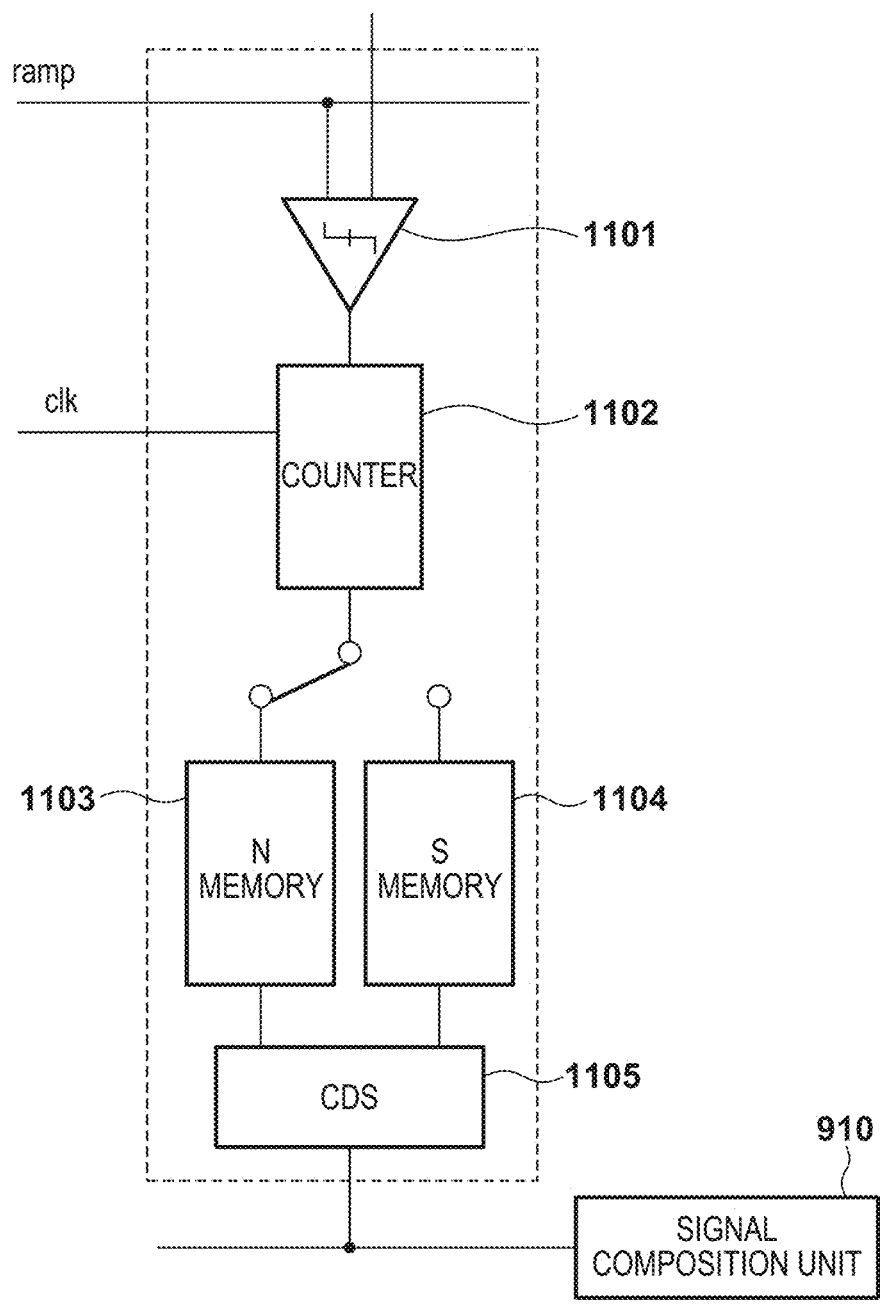
FIG. 12 is a circuit diagram of a unit column circuit in the third embodiment.

FIG. 12 is a diagram showing a structure of a unit column circuit 908. The unit column circuit 908 is configured to include a comparator 1101, a counter 1102, an N memory 1103, an S memory 1104, and a CDS circuit 1105.

The comparator 1101 compares a pixel signal that has been read out from a unit pixel 901 with a non-illustrated ramp signal ramp. When the magnitude relationship between the pixel signal and the ramp signal has been inverted, the output from the comparator 1101 is inverted as well. The counter 1102 performs a count operation based on an input clock signal clk, and stops the count operation when the output from the comparator 1101 has been inverted, thereby performing AD conversion.

After AD conversion, the counter 1102 transmits the output to the N memory 1103 when a held count value is the result of AD conversion corresponding to an FD (floating diffusion unit) reset level, and to the S memory 1104 when the held count value is the result of AD conversion of the pixel signal. The CDS circuit 1105 subtracts a value held in the N memory 1103 from a value held in the S memory 1104, thereby obtaining a signal that represents the pixel signal with reset noise components removed therefrom.

Figure 13:
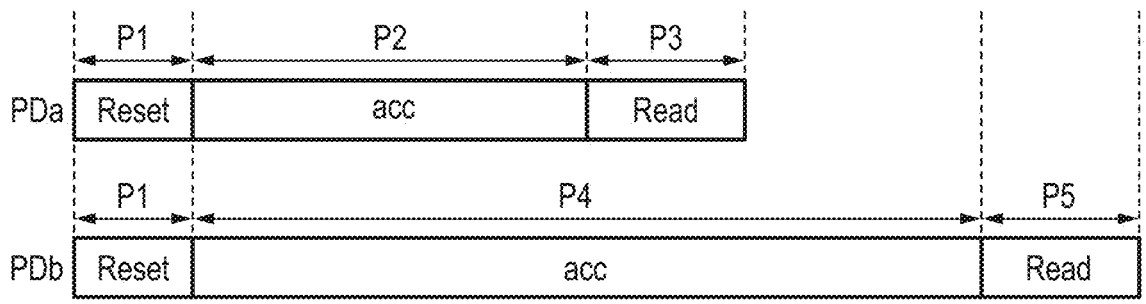
FIG. 13 is a diagram showing the timings of accumulation and readout for the case of HDR based on an accumulation period switching method.

FIG. 13 is a diagram showing an accumulation operation and a readout operation for a case where the accumulation period switching method is used as the HDR method. Regarding the PDa 1001, resetting is performed in a period P1, and accumulation is performed in a period P2. Thereafter, the readout operation is performed in a period P3. On the other hand, regarding the PDb 1002, resetting is performed in the period P1, and accumulation is performed in a period P4. Thereafter, the readout operation is performed in a period P5. The sequence of operations is the same for both of the PDa 1001 and the PDb 1002, but the period P2 and the period P4, which are the periods in which accumulation is performed, differ from each other in length. In this way, a low-exposure signal and a high-exposure signal can be obtained. An HDR signal can be obtained by compositing these signals in the signal composition unit 910.

In a case where the gain switching method is used as the method of obtaining an HDR signal, a signal FDa (see FIG. 11) is set to Lo, and a signal FDb (see FIG. 11) is set to Hi. As a result, the FD capacity on the PDb 1002 side increases, and the gain for the pixel signal corresponding to the PDb 1002 becomes lower than that corresponding to the PDa 1001. In this way, a low-exposure signal and a high-exposure signal can be obtained. An HDR signal can be obtained by compositing these signals in the signal composition unit 910.

Note that in performing the readout using different grains, the ramp signal supplied to the comparator 1101 may be changed, or a gain of a non-illustrated preamplifier inside the unit column circuit 908 may be changed, instead of changing the FD capacity.

Figure 14:
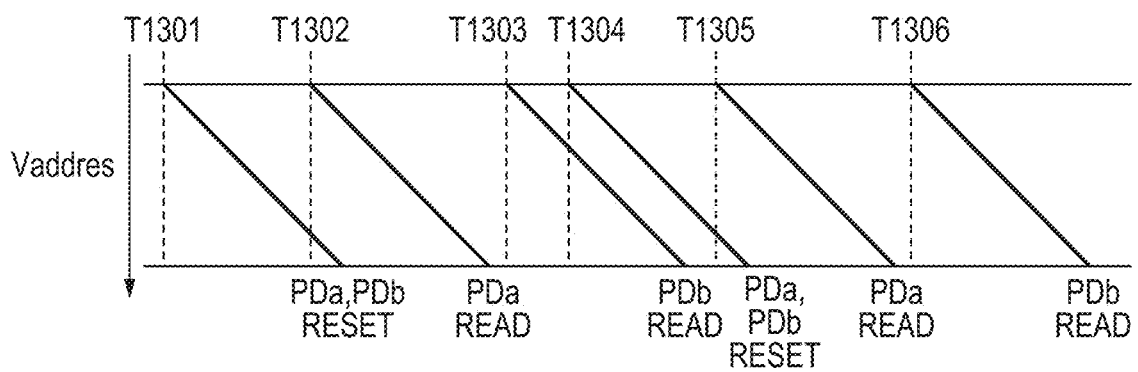
FIG. 14 is a timing chart of a readout operation in the entirety of a pixel region for the case of HDR based on the accumulation period switching method.

FIG. 14 is a diagram showing the readout operation in the entire pixel region 900 for a case where the accumulation period switching method is used as the method of obtaining an HDR signal.

At timing T1301, in both of the PDa 1001 and the PDb 1002, a reset operation is performed sequentially for respective rows, and accumulation is started. Next, at timing T1302, readout is started with respect to the PDa 1001; the readout is performed on a row-by-row basis until the readout is completed for all rows. Next, at timing T1303, readout is started with respect to the PDb 1002; the readout is performed on a row-by-row basis until the readout is completed for all rows. The operations from subsequent timing T1304 to timing T1306 are similar to the operations from timing T1301 to timing T1303. Although both of the PDa 1001 and the PDb 1002 start the accumulation at the same timing, they differ from each other in the timing of readout, and thus they differ from each other in the accumulation period.

Figure 15:
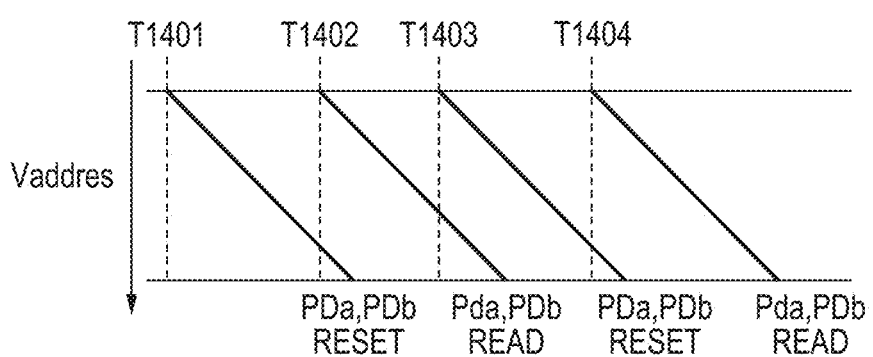
FIG. 15 is a timing chart of a readout operation in the entirety of a pixel region for the case of HDR based on a gain switching method.

FIG. 15 is a diagram showing the readout operation in the entire pixel region 900 for a case where the gain switching method is used as the method of obtaining an HDR signal.

At timing T1401, in both of the PDa 1001 and the PDb 1002, a reset operation is performed sequentially for respective rows, and accumulation is started. Next, at timing T1402, readout is started with respect to both of the PDa 1001 and the PDb 1002; the readout is performed on a row-by-row basis until the readout is completed for all rows. The operations from subsequent timing T1403 to timing T1404 are similar to the operations from timing T1401 to timing T1402. As both of the PDa 1001 and the PDb 1002 have the same timing to start accumulation and the same timing of readout, they have the same accumulation period.

With the gain switching method, in a case where there is a large difference in luminance on the surface, gradation may not be achieved in dark areas where the light amount is extremely small even if a gain has been applied to pixel signals. On the other hand, with the accumulation period switching method, a high-exposure signal is obtained by setting a long accumulation period without applying a gain. Therefore, gradation can be achieved in dark areas of a high-exposure signal compared to the gain switching method.

However, in a case where a moving subject exists, subject blur occurs with respect to a photodiode that has a longer accumulation period among the different accumulation periods. For this reason, in one embodiment, the gain switching method is used in the case of a moving subject, and the accumulation period switching method is used in the case of a motionless subject.

Figure 16:
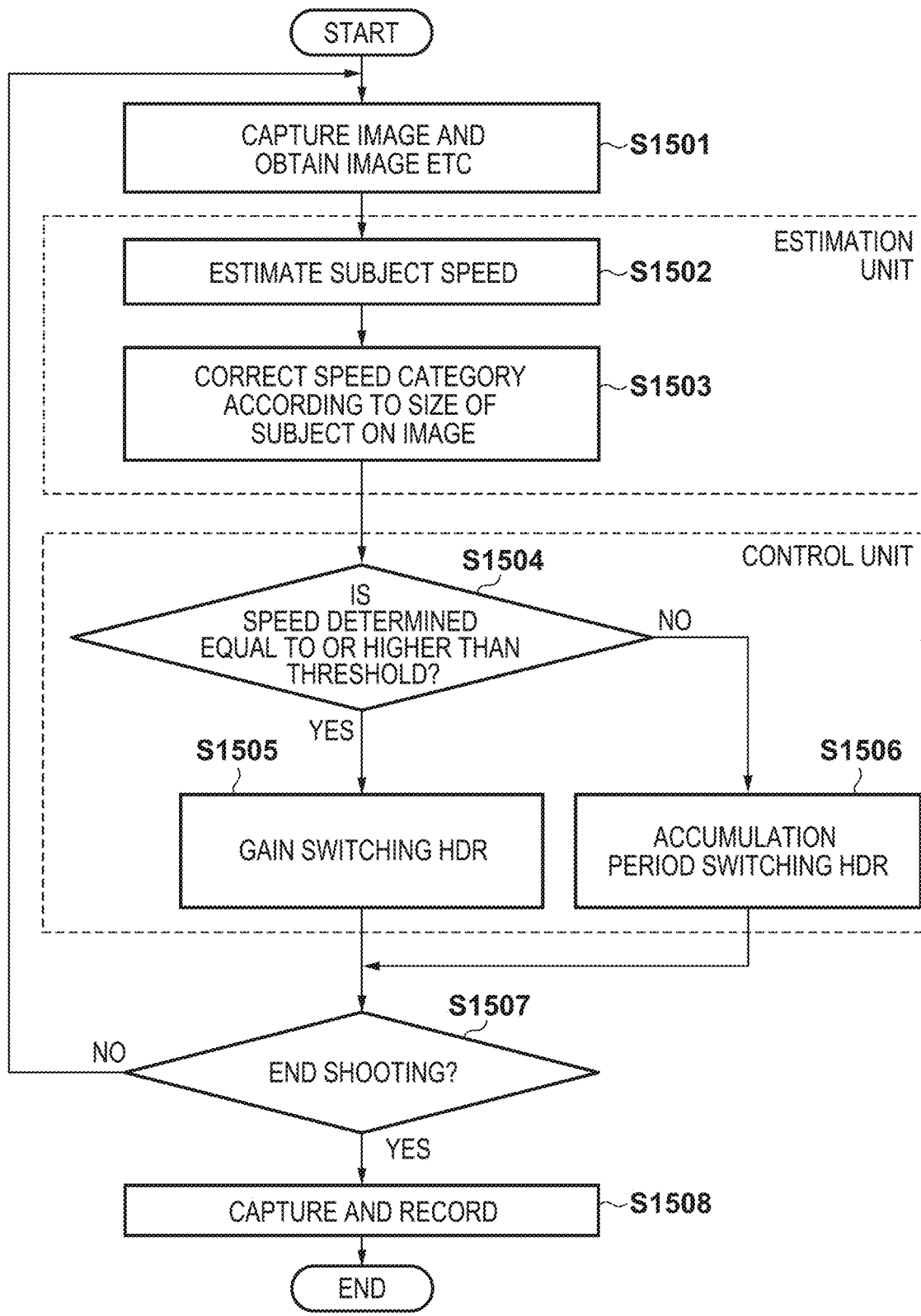
FIG. 16 is a flowchart showing the operations of switching between image capturing operations for HDR images in accordance with the estimated speed of the subject.

FIG. 16 is a flowchart showing the operations of switching between the methods of obtaining an HDR signal in accordance with the estimated speed of the subject. As steps S1501 to S1503 are similar to steps S401 to S403 of FIG. 5, a description thereof is omitted.

In step S1504, the control unit 109 determines whether the estimated speed of the subject is equal to or higher than a predetermined threshold. When the estimated speed of the subject is equal to or higher than the threshold, the operations proceed to step S1505, and the image sensor 105A is caused to perform operations of the gain switching method. When the estimated speed of the subject is lower than the threshold, the operations proceed to step S1506, and the image sensor 105A is caused to perform operations of the accumulation period switching method.

In step S1507, the control unit 109 determines whether an operation of ending shooting has been performed. When the operation of ending shooting has been performed, a captured image is recorded in step S1508, and the operations are ended. When the operation of ending shooting has not been performed in step S1507, the operations return to step S1501, and the sequence of operations is repeated.

As described above, the present embodiment switches between the methods of obtaining an HDR signal based on the estimated speed of a subject at the time of image capture that will take place after a predetermined period. As a result, subject blur can be further suppressed compared to a case where the methods of obtaining an HDR signal are switched based on shooting conditions and the like. Furthermore, subject blur can be further suppressed compared to a case where the methods of obtaining an HDR signal are mechanically switched based on the thresholds for the exposure amount and the accumulation period.

Fourth Embodiment

In the first to third embodiments, the subject speed in the next frame, or the frame following the next frame, is estimated from an image obtained through live-view shooting, and the image capturing operation is controlled based on the result of this estimation. However, as the photographer depresses the release button at an arbitrary timing, there is a possibility that the time of estimation of the subject speed, which is performed at a regular interval in live-view shooting, differs from the time of shooting.

Figure 17:
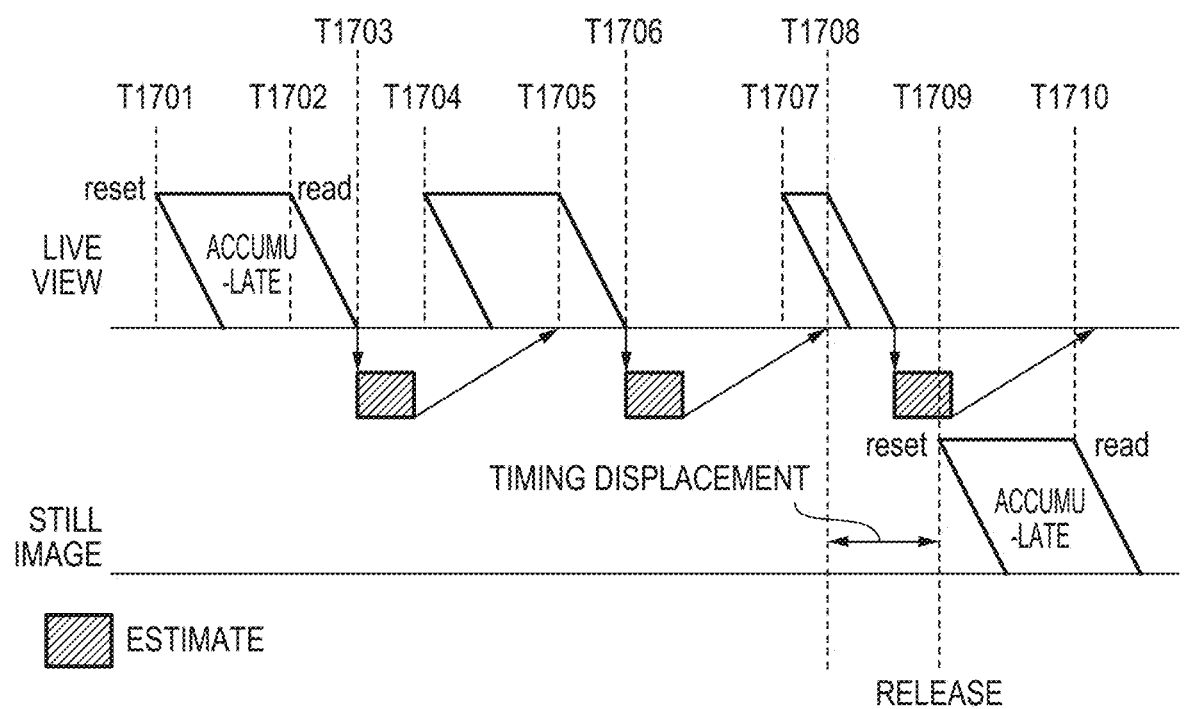
FIG. 17 is a timing diagram showing the operations of live-view shooting and subject speed estimation in a fourth embodiment.

FIG. 17 is a diagram showing the timings of the operations of live-view shooting and estimation of the subject speed in the first to third embodiments. The operations of FIG. 17 are the operations of so-called live-view shooting whereby still image shooting is performed while displaying, on the display unit 114, images that have been output from the image sensor 105 at a regular interval. Here, readout of an image is started at a regular interval, namely at timing T1702, timing T1705, and timing T1708.

At timing T1701, a reset operation is performed sequentially for respective rows, and accumulation is started. Next, readout is started sequentially on a row-by-row basis at timing T1702, and readout for all rows is completed at timing T1703. Thereafter, using an image obtained at timing T1703, the estimation unit 108 estimates the speed that a subject will have at timing T1705.

The control unit 109 controls the timing to start a reset operation at timing T1704 based on the estimated speed of the subject, thereby controlling an accumulation period. Note that there is a case where, due to a long accumulation period, timing T1704 at which the reset operation is performed coincides with or precedes the completion of estimation; in view of this, a restriction may be placed on the accumulation period so that timing T1704 coincides with or succeeds the completion of estimation of the subject speed.

After the reset operation and the readout operation are performed at timing T1704 and timing T1705, respectively, the estimation unit 108 estimates the speed that the subject will have at timing T1708, at which the next frame in live view will be read out, with use of an image obtained at timing T1706. At this time, timing T1708 is controlled by the control unit 109 based on the estimation of the speed that the subject will have at timing T1705.

Next, the reset operation and the readout operation are performed at timing T1707 and timing T1708, respectively. An example shown here pertains to a case where the estimated speed that the subject will have at timing T1708 is fast. Therefore, based on the estimated speed of the subject, the control unit 109 performs control so as to delay the start of the reset operation at timing T1707 in order to shorten the accumulation period.

Next, a description is given of the operations for a case where the release button has been depressed. In a case where the release button is depressed at timing T1709, the control unit 109 issues an instruction for starting the reset operation and accumulation at timing T1709 and starting readout at timing T1710, and a still image is obtained. In this case, as the estimated speed of the subject at timing T1709 has not been obtained, the control unit 109 controls the accumulation period based on the estimated speed of the subject at timing T1708, which is closest to timing T1709 of the depression of the release button.

Therefore, if the subject speed differs between timing T1708 at which the subject is estimated to have the estimated speed and timing T1709 of the depression of the release button, control of the accumulation period becomes inappropriate.

Figure 18A:
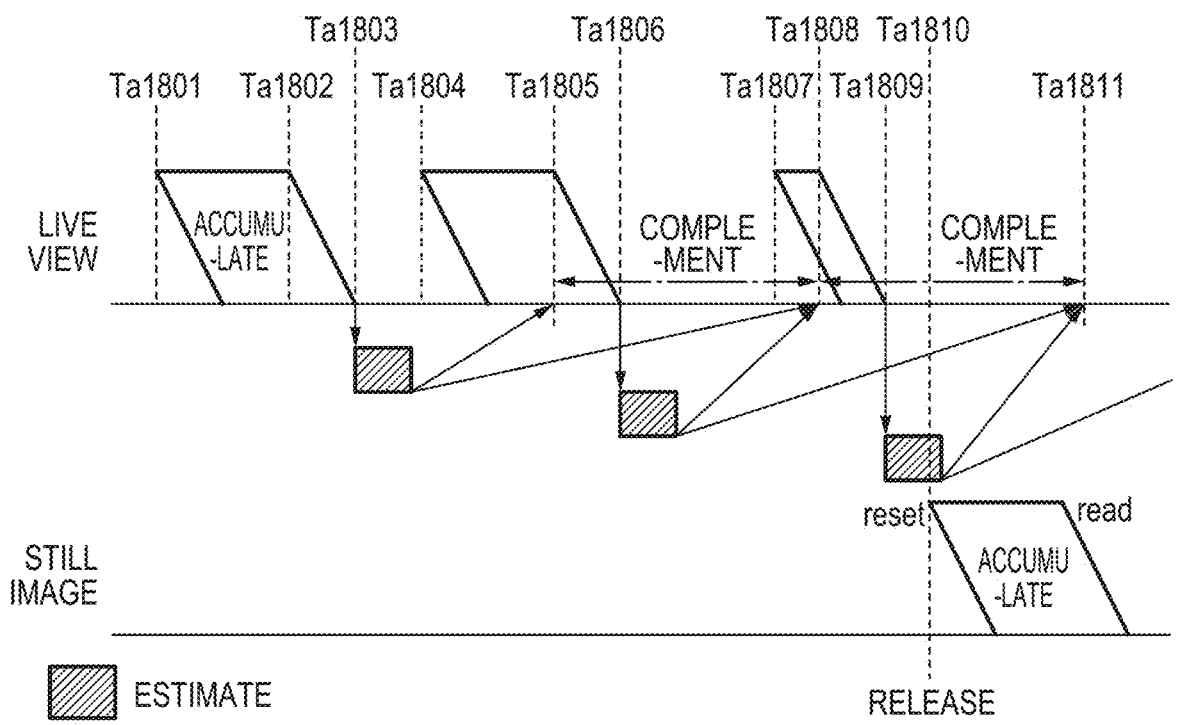
FIGS. 18A, 18B are diagrams showing examples in which the estimated speed at an arbitrary timing is obtained by interpolating the estimated speed.
Figure 18B:
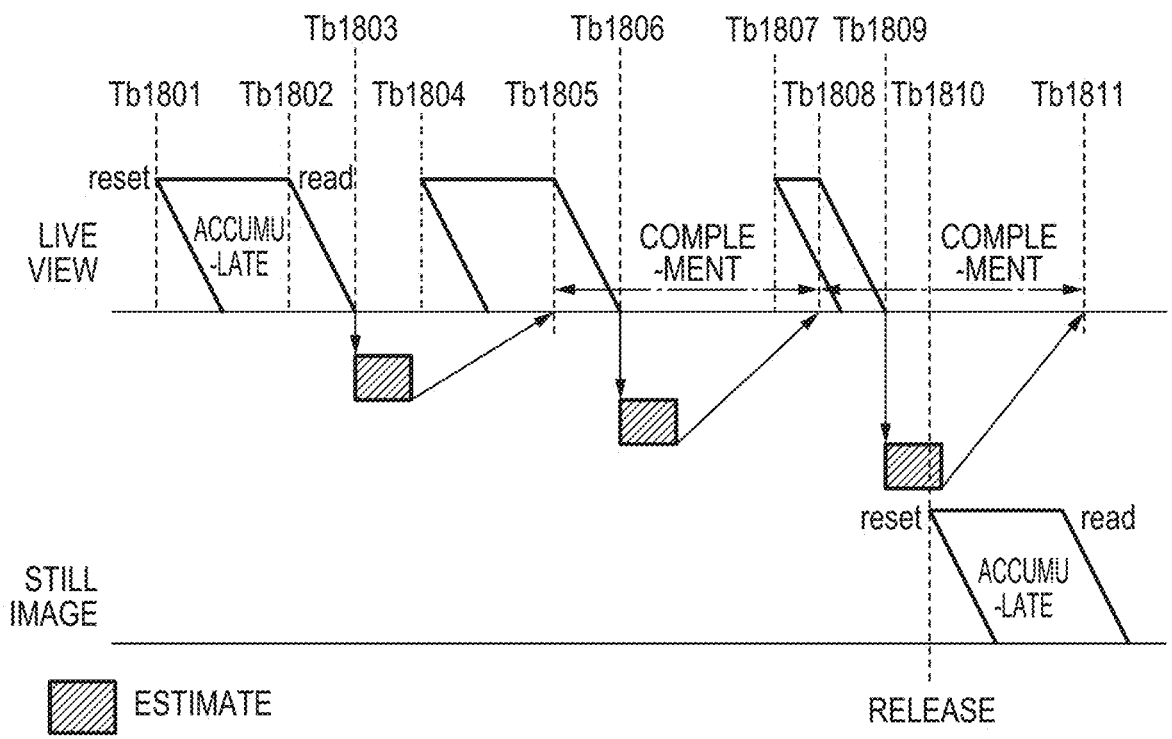

FIGS. 18A, 18B are diagrams showing examples in which the estimated speed at an arbitrary timing is obtained by interpolating the estimated speed between the estimated subject speeds that have been estimated, at a regular interval, to take place after a predetermined period in the present embodiment.

FIG. 18A is a diagram showing the timings of the operations of estimating, from an obtained image, the speeds that the subject will have after two different predetermined periods, and interpolating the estimated speed of the subject between two different times. Regarding FIG. 18A, differences from FIG. 17 will be described.

In FIG. 17, using an image obtained at timing T1703, the estimation unit 108 estimates the speed that the subject will have at timing T1705 of the start of readout of the next frame in live view. In contrast, in FIGS. 18A, 18B, using an image obtained at timing Ta1803, the estimation unit 108 estimates the speeds that the subject will have at timing Ta1805 of the start of readout of the next frame in live view, and also at timing Ta1808 of the start of readout of the frame that follows the next frame. In other words, while the subject speed is estimated with respect to the next frame in FIG. 17, the subject speed is estimated with respect to the next frame, as well as the frame that follows the next frame, in FIGS. 18A, 18B.

Furthermore, based on the obtained estimated speeds of the subject at timing Ta1805 and timing Ta1808, the estimation unit 108 interpolates the estimated speed that the subject will have between timing Ta1805 and timing Ta1808. This interpolation of the estimated speed can be realized by using a known method, such as linear interpolation. Also with respect to an image obtained at timing Ta1806, the estimation unit 108 similarly estimates the speeds that the subject will have at timing Ta1808 of the start of readout of the next frame in live view, and also at timing Ta1811 of readout of the frame that follows the next frame, and interpolates the estimated subject speed therebetween. Through this interpolation processing, the estimated speed of the subject at an arbitrary timing can be obtained.

Therefore, even if the release button is depressed at timing Ta1810, the control unit 109 can control the accumulation period based on the interpolated estimated speed of the subject at timing Ta1810.

Note that when a period required for speed estimation is short, the result of speed estimation that has been performed with respect to an immediately preceding frame may be used in the interpolation.

This will be specifically described using FIG. 18A. The description will be provided using an example of interpolation between timing Ta1808 and timing Ta1811; at timing Ta1806, the speeds at timing Ta1808 and timing Ta1811 are estimated based on the image obtained at timing Ta1806, and the estimated speed therebetween is interpolated.

Here, assume a case where a period required for speed estimation is short, and the estimation of the speed at timing Ta1811 corresponding to the next frame, which has been performed using the image obtained at timing Ta1809, has completed before Ta1810 at which the release button is depressed. In this case, the newly obtained estimated speed is used as the estimated speed at timing Ta1811, and the estimated speed at timing Ta1810 is obtained from interpolation between the newly obtained estimated speed and the estimated speed at timing Ta1808 that was obtained based on timing Ta1806.

In this way, the estimated speed at timing Ta1811, which is used in interpolation between timing Ta1809 and timing Ta1811, can be obtained using the image of the closer timing Ta1809. Therefore, the accuracy of the interpolated estimated speed at timing Ta1810 of the depression of the release button can be increased.

FIG. 18B is a timing diagram of the operations of estimating, from an obtained image, the subject speed and the subject acceleration after a predetermined period, and performing interpolation until the next estimated speed of the subject is obtained.

The subject acceleration mentioned here denotes the amount of change in the subject speed relative to time, and can be acquired by using a learned model obtained through machine learning based on the association between a subject within an input image and the acceleration of the next action of this subject with use of, for example, known deep learning techniques.

In FIG. 18B, using an image obtained at timing Tb1803, the estimation unit 108 estimates the speed and the acceleration that the subject will have at timing Tb1805 of readout of the next frame in live view.

Similarly, using images obtained at timing Tb1806 and timing Tb1809, the estimation unit 108 estimates the speeds and the accelerations that the subject will have at timing Tb1808 and timing Tb1811 of readout of the next frame in live view, respectively.

Furthermore, using the estimated speed and the estimated acceleration of the subject at timing Tb1805, the estimation unit 108 interpolates the estimated speed that the subject will have until timing Tb1808 at which the next estimation result is obtained. Similarly, based on the estimation result obtained at timing Tb1808, the estimation unit 108 interpolates the estimated speed that the subject will have until timing Tb1811. Through this interpolation processing, the estimated speed of the subject at an arbitrary timing can be obtained.

Therefore, even if the release button is depressed at timing Tb1810, the control unit 109 can control the accumulation period based on the interpolated estimated speed of the subject at timing Tb1810.

As described above, the estimated speed at an arbitrary timing is obtained by interpolating the estimated speed between the subject speeds that have been estimated, at a regular interval, to take place after a predetermined period. In this way, the image capturing operation can be controlled based on the estimated speed that the subject will have at the timing of depression of the release button by the photographer.

Fifth Embodiment

In the first to fourth embodiments, the image capturing operation is controlled using the estimated speed of a subject at the timing of depression of the release button, or the timing close thereto. However, in a case where the accumulation period is controlled in accordance with the estimated speed of the subject, the speed of the subject may change after the release button is depressed and accumulation is started. For example, when the subject is quickly accelerating, the estimated speed of the subject differs significantly between the time of the start of accumulation and the time of the end of accumulation.

In the present embodiment, the accumulation period is controlled using the estimated speed of the subject at the midpoint of accumulation (the time of the midpoint of accumulation), instead of the estimated speed of the subject at the timing of depression of the release button or the timing close thereto. When the accumulation period is controlled in accordance with the subject speed at the midpoint of accumulation, instead of the subject speed at the time of the start of accumulation, for example, the suppression of subject blur can be performed more appropriately.

FIGS. 19A, 19B are diagrams showing control of the accumulation period based on the subject speed at the time of the start of accumulation in the fourth embodiment. FIG. 19A shows a flowchart for deciding on the accumulation period, and FIG. 19B shows a relationship between the estimated speed of the subject and the timings of accumulation for a case where the flowchart of FIG. 19A has been implemented.

In step S1901, the subject speed at an arbitrary timing is estimated. It is sufficient that this estimation use interpolation of the estimated speed between two frames shown in FIG. 18A, or interpolation of the subject acceleration shown in FIG. 18B. In this way, the estimated subject speed at timing t indicated by a curved line V of FIG. 19B is obtained.

In step S1902, upon depression of the release button, the timing of the start of accumulation is decided on in consideration of a release time lag. Next, the accumulation is started in step 1903.

In FIG. 19B, the release takes place at timing T1901, the accumulation starts at timing T1902 at which the subject speed is Vs, the accumulation period is decided on based on the subject speed Vs, and the accumulation ends at timing T1903.

In this case, the subject speeds at timing T1902 and timing T1903 are Vs and Ve, respectively; thus, a difference arises between the speeds. Therefore, if the subject of FIG. 19B accelerates, there is a possibility that subject blur cannot be suppressed sufficiently under shooting conditions (accumulation period) that have been decided on based on the subject speed at the time of the start of accumulation.

Figure 20A:
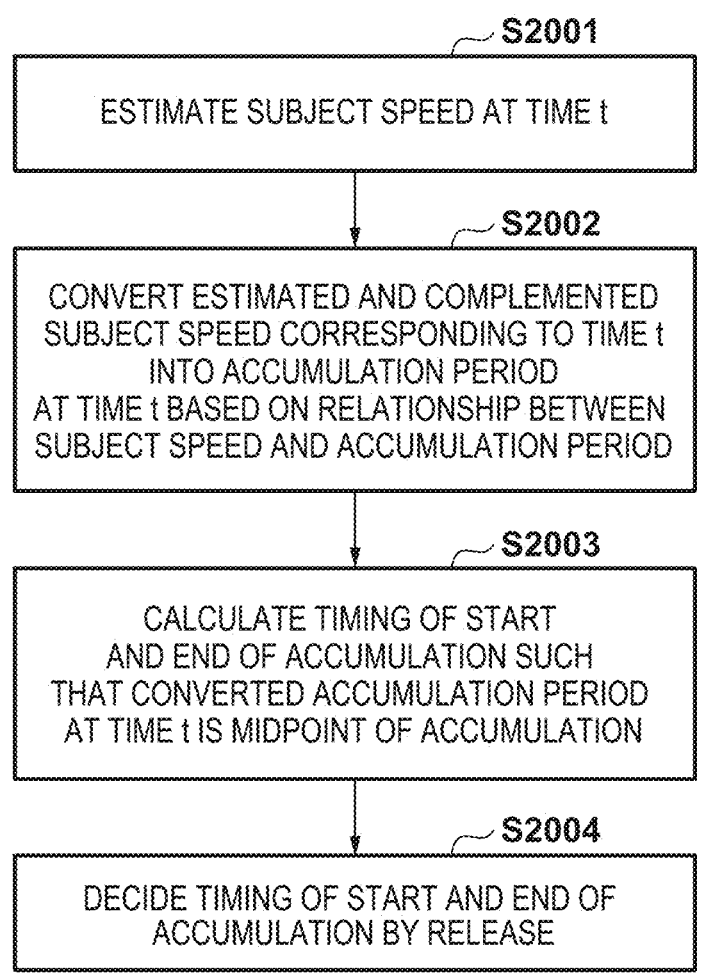
FIGS. 20A, 20B are diagrams showing control of an accumulation period based on the subject speed at the midpoint of accumulation.
Figure 20B:
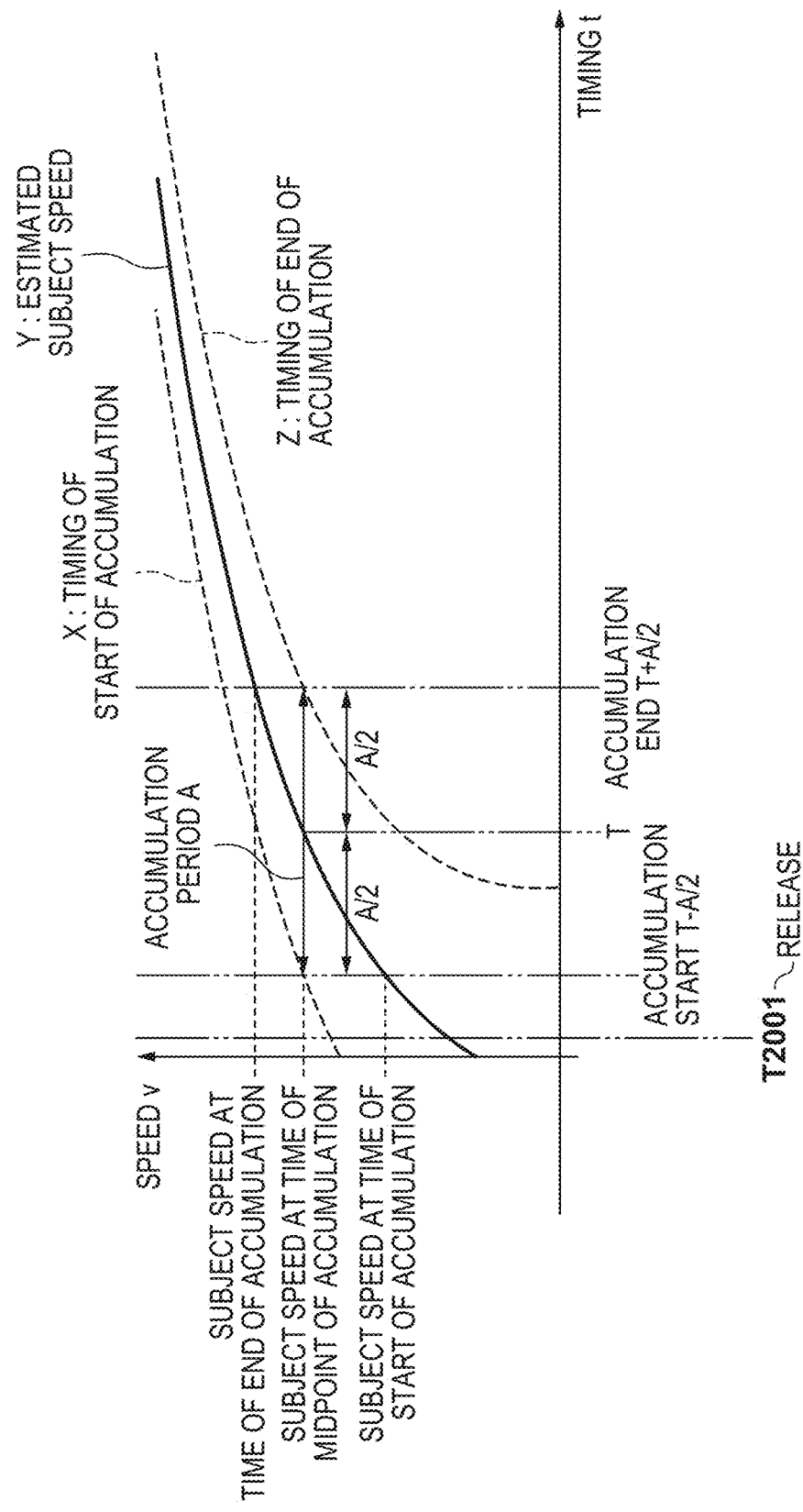

FIGS. 20A, 20B are diagrams showing control of the accumulation period with use of the subject speed at the midpoint of accumulation in the present embodiment. FIG. 20A shows a flowchart for deciding on the accumulation period, and FIG. 20B shows a relationship between the estimated speed of the subject and the timings of accumulation for a case where the flowchart of FIG. 20A has been implemented.

In step S2001, the subject speed at an arbitrary timing is estimated. It is sufficient that this estimation uses interpolation of the estimated speed between two frames shown in FIG. 18A, or interpolation of the subject acceleration shown in FIG. 18B.

In step S2002, the accumulation period is decided on based on the estimated speed of the subject at timing t. Furthermore, based on the correspondence between the subject speed and the accumulation period, the estimated speed of the subject at timing t is converted into the accumulation period corresponding to timing t.

Next, in step S2003, the timing of the start of accumulation corresponding to timing t is obtained from the accumulation period that has been decided on in such a manner that the timing t coincides with the midpoint of accumulation.

Using FIG. 20B, the following describes, in detail, control of the accumulation period with use of the subject speed at the midpoint of accumulation according to the flowchart of FIG. 20A.

In step S2001, the subject speed at an arbitrary timing is estimated and interpolated. In this way, the estimated speed of the subject at timing t indicated by a curved line Y of FIG. 20B is obtained.

In step S2002, the accumulation period corresponding to timing t is obtained from the estimated subject speed at timing t.

In step S2003, the timing of the start of accumulation and the timing of the end of accumulation are decided on so that the accumulation period corresponding to timing t is symmetric about timing t. This leads to the obtainment of the timing of the start of accumulation based on the estimated subject speed at the midpoint of accumulation, which is indicated by a curved line X, as well as the timing of the end of accumulation based on the estimated subject speed at the midpoint of accumulation, which is indicated by a curved line Z, as shown in FIG. 20B.

In step S2004, when the timing of the start of accumulation has been decided on based on the release, the accumulation period is decided on based on the curved line X and the curved line Z.

A description is now given of an example in which certain timing T is used as the midpoint of accumulation. An accumulation period A is decided on based on the estimated speed of the subject at timing T (step S2002). As this timing T is used as the midpoint of accumulation, the accumulation starts at T−(A/2), and the accumulation ends at T+ (A/2) (step S2003).

As a result, when the release is depressed at timing T2001 and the accumulation starts at T−(A/2) in step S2004, provided that the accumulation period is A, control is performed based on the subject speed at the midpoint of accumulation.

In other words, as opposed to the decision of the accumulation period based on the estimated speed of the subject, the estimated speed of the subject at timing t is converted into the timing of the start of accumulation so that the accumulation period is decided on from the timing of the start of accumulation with use of the relationship between the estimated speed of the subject and the accumulation period.

As described above, according to the present embodiment, the accumulation period can be controlled in accordance with the subject speed at the midpoint of accumulation and, for example, the suppression of subject blur can be performed more appropriately. Note that it is permissible to switch the subject speed that is used in control from among the speed at the start of accumulation, the speed at the midpoint of accumulation, and the speed at the end of accumulation, in accordance with acceleration and deceleration of the subject.

Sixth Embodiment

The configuration of an image capturing apparatus according to a sixth embodiment is similar to the configuration of the digital camera 100 of the first embodiment shown in FIG. 1, and thus a description thereof is omitted.

Figure 21:
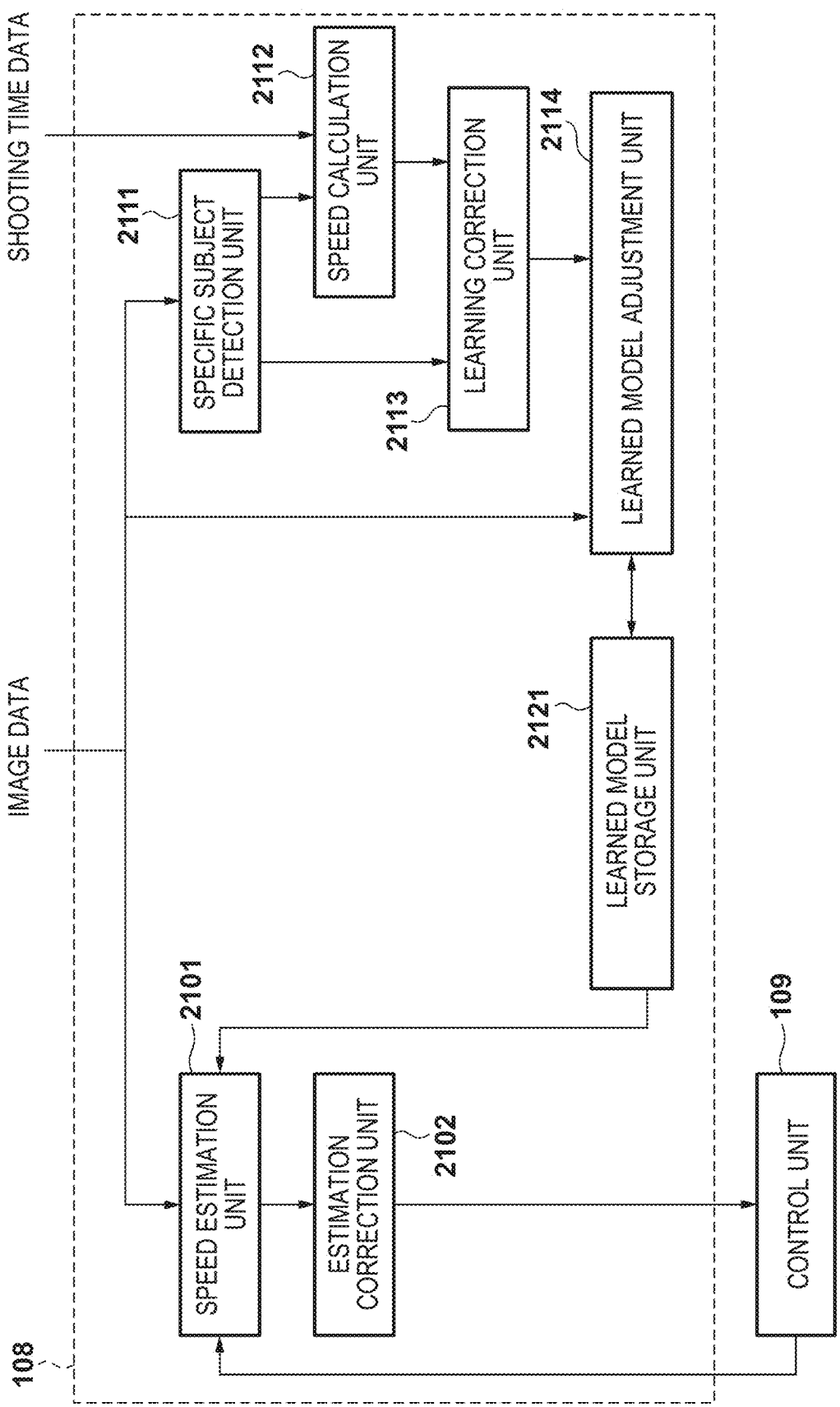
FIG. 21 is a diagram showing a block configuration of an estimation unit in a sixth embodiment.

FIG. 21 is a block diagram showing the configuration of the estimation unit 108, which is shown in FIG. 1, according to the sixth embodiment. The estimation unit 108 is configured to include a speed estimation unit 2101, an estimation correction unit 2102, a specific subject detection unit 2111, a speed calculation unit 2112, a learning correction unit 2113, a learned model adjustment unit 2114, and a learned model storage unit 2121.

With respect to an image signal of one image output from the memory unit 111, the speed estimation unit 2101 estimates and outputs the speed that a subject within the image signal will have at the time of image capture that will take place after a predetermined period, with reference to a learned model held in the learned model storage unit 2121.

The control unit 109 gives notification of the timing of image capture that will take place after a predetermined period.

This estimation of the subject speed can be realized by using a learned model obtained through machine learning based on the association between a subject within an input image and the speed of the next action of this subject with use of, for example, known deep learning techniques. As the learned model, one specific subject image and the speed of a specific subject after a predetermined period have been learned in association with each other.

One specific subject image includes orientation information of the specific subject; for example, the learned model has been learned based on the association between the orientation information of the specific subject and the speed of the specific subject after a predetermined period with use of deep learning techniques. Therefore, the speed of a sudden motion can be estimated using an input image that shows a sign of such a sudden motion in advance. The specific subject detection unit 2111, the speed calculation unit 2112, and the learned model adjustment unit 2114 are used in learning of the learned model, which will be described later.

For example, in a case where the image of the standing dog shown in FIG. 3A, which has already been explained, has been input to the estimation unit 108, the speed estimation unit 2101 outputs an estimated speed of 0 km/h. In a case where the image of the running dog shown in FIG. 3B has been input to the speed estimation unit 2101, the speed estimation unit 2101 outputs an estimated speed of 30 km/h.

The estimation correction unit 2102 corrects the estimated speed output from the speed estimation unit 2101 in accordance with the size of the subject in the input image on the image surface. Specifically, when the size of the subject on the image surface is small, the correction is made so that the speed on the image surface decreases; conversely, when the size is large, the correction is made so that the speed on the image surface increases.

Also, the estimation correction unit 2102 may correct the estimated speed output from the speed estimation unit 2101 with use of the distance to the subject and the image capture magnification factor of the lens unit 101, instead of the size of the subject on the image surface. Furthermore, the estimated speed output from the speed estimation unit 2101 may be corrected using ranging information based on known ranging techniques.

The estimation correction unit 2102 transmits the corrected estimated speed of the subject to the control unit 109. The control unit 109 selects a corresponding program line chart in accordance with the estimated speed of the subject, and decides on such image capturing conditions as the shutter speed, ISO film speed, and diaphragm based on an EV value (exposure value) obtained by the metering unit 107. The control unit 109 determines the type of movement, namely motionless, low speed, intermediate speed, or high speed, based on the aforementioned estimated speed of the subject. Here, the subject is treated as a motionless subject when the estimated speed of the subject is lower than a threshold.

Here, the program line charts that are respectively applied to a motionless subject, a low-speed moving subject, an intermediate-speed moving subject, and a high-speed moving subject are similar to the program line charts of FIGS. 4A to 4D, which have been described in the first embodiment.

Specifically, FIG. 4A shows an example of a program line chart corresponding to a motionless subject, FIG. 4B shows an example of a program line chart corresponding to a low-speed moving subject, FIG. 4C shows an example of a program line chart corresponding to an intermediate-speed moving subject, and FIG. 4D shows an example of a program line chart corresponding to a high-speed moving subject. As the program line charts of FIGS. 4A to 4D and a method of selecting the same are similar to those of the first embodiment, a description thereof is omitted.

Furthermore, the operations of so-called live-view shooting whereby still image shooting is performed while displaying images output from the image sensor 105 on the display unit 114 in a P (program) mode, in which the image capturing apparatus decides on such image capturing conditions as the shutter speed, ISO film speed, and diaphragm, are also similar to the operations of the first embodiment shown in FIG. 5, and thus a description thereof is omitted. That is to say, in the present embodiment, too, the estimation unit 108 estimates the speed of the subject with use of a preliminary shot image during live-view shooting, and a program line chart with which the control unit 109 decides on image capturing conditions in accordance with the estimated speed is selected and switched from among the program line charts shown in FIGS. 4A to 4D.

Next, learning of the learned model in the estimation unit 108 will be described. FIG. 22 is a diagram schematically illustrating learning of the learned model.

In FIG. 22, information 9000 is information held in the memory unit 111, and includes shooting time information (9011, 9012, . . . ) and images (9001, 9002, . . . ). The shooting time of the image 9001, the shooting time of the image 9002, the shooting time of the image 9003, and the shooting time of the image 9004 respectively match the shooting time information 1 (9011), the shooting time information 2 (9012), the shooting time information 3 (9013), and the shooting time information 4 (9014).

Information 9020 is information held in the specific subject detection unit 2111, and includes information obtained by extracting the position and the size of a specific subject on the image surface. Position and size information 9021 corresponds to the image 9001, position and size information 9022 corresponds to the image 9002, position and size information 9023 corresponds to the image 9003, and position and size information 9024 corresponds to the image 9004.

Information 9030 is a part of information held in the speed calculation unit 2112, and includes speed and time information. Information 9040 is a part of information held in the speed calculation unit 2112, and includes speed information. The speed and time information 9031 corresponds to the speed information 9041, the speed and time information 9032 corresponds to the speed information 9042, the speed and time information 9033 corresponds to the speed information 9043, and the speed and time information 9034 corresponds to the speed information 9044. Dash lines in FIG. 22 are dash lines that schematically indicate which information is calculated based on which information.

The following describes a learning method for the learned model in line with FIG. 22.

The memory unit 111 holds at least two images (9001, 9002, . . . ) that were shot at different times together with their respective pieces of shooting time information (9011, 9012, . . . ).

The specific subject detection unit 2111 reads out the images (9011, 9012, . . . ) from the memory unit 111, detects a specific subject (e.g., a specific dog) that has been registered in advance from these images, and specifies pieces of information of the detected positions and sizes (9021, 9022, . . . ). The specified pieces of position and size information of the subject that correspond in number to a predetermined number of frames are held.

The speed calculation unit 2112 calculates time corresponding to the subject speed (speed and time information) based on the pieces of position information of the specific subject that have been read out from the specific subject detection unit 2111, and on the pieces of shooting time information that have been read out from the memory unit 111, and holds the calculated time. Specifically, two pieces of position information (9021, 9022) are read out from the specific subject detection unit 2111, and the amount of movement is calculated.

Also, the pieces of shooting time information (9011, 9012) corresponding to the aforementioned pieces of position information (9021, 9022) are read out from the memory unit 111, and the time difference is calculated. By dividing the aforementioned calculated amount of movement by the calculated time difference, the speed 9041 of the specific subject at average time 9031 of the shooting time 9011 and the shooting time 9012 is calculated, and the calculated speed 9041 is held.

Furthermore, the speed calculated in the foregoing manner is the speed in a planar direction perpendicular to the straight line connecting between the camera and the subject (hereinafter referred to as the angle-of-view direction). Note that it is permissible to detect a plurality of characteristic points (e.g., both eyes of a specific dog) within the specific subject on an image-by-image basis, further calculate the speed in the direction of the straight line connecting between the image capturing apparatus and the subject (hereinafter referred to as the normal direction) from the amount of change in the characteristic points (e.g., the amount of change in the length between both eyes of the specific dog) between images, and calculate the speed of the subject by computing vectors of the speed in the normal direction and the speed in the angle-of-view direction.

In order to make the subject speed associated with the orientation of the subject, which is irrelevant to the size of the subject in the image on the image surface, the learning correction unit 2113 corrects the subject speed output from the speed calculation unit 2112 based on the size of the specific subject on the image surface that has been read out from the specific subject detection unit 2111, and holds the corrected subject speed.

Specifically, the input from the speed calculation unit 2112 is increased and held when the size of the specific subject on the image surface is small, and the input from the speed calculation unit 2112 is reduced and held when the size of the subject on the image surface is large. Also, the learning correction unit 2113 may correct the estimated speed that has been read out from the speed calculation unit 2112 with use of the distance to the subject and the image capture magnification factor of the lens unit 101, instead of the size of the subject on the image surface. Furthermore, the estimated speed that has been read out from the speed calculation unit 2112 may be corrected using a subject distance that has been calculated using, for example, known image capturing surface ranging techniques.

Repeating the foregoing speed calculation enables calculation of the speed 9042 at the average time 9032 of the shooting time 9012 and the shooting time 9013, the speed 9043 at the average time 9033 of the shooting time 9013 and the shooting time 9014, and so forth.

The learned model adjustment unit 2114 reads out an image from the memory unit 111, and reads out the speed after the elapse of a predetermined delay period since the shooting time of the image from the learning correction unit 2113. Then, the learned model held in the learned model storage unit 2121 is caused to learn the image information and the speed that have been read out as learning data and supervisory data, respectively. For example, the image 9001 is used as learning data, and the speed information 9042 is used as supervisory data.

Repeating the foregoing operations enables generation and learning of learning data for predicting the speed after a predetermined delay period from the orientation of the specific subject that is included in one image and has been registered in advance.

Furthermore, although the position and size information of the specific subject is held in the specific subject detection unit 2111, the speed information and the speed and time information are held in the speed calculation unit 2112, and the corrected speed information is held in the learning correction unit 2113 in the foregoing description, they may be collectively held in the memory unit 111.

Furthermore, the learned model storage unit 2121 may include a plurality of learned models, and a plurality of periods may be learned as the aforementioned predetermined delay period. In this way, the speeds after the plurality of predetermined delay periods can be predicted from one image.

Furthermore, the speed calculation unit 2112 may calculate the accelerations based on the pieces of speed information (9041, 9042, . . . ) corresponding to the pieces of speed and time information (9031, 9032, . . . ), and the images and the accelerations may be learned in association with each other.

Specifically, an image-acceleration learned model is held in the learned model storage unit 2121 separately from the learned model. The speed calculation unit 2112 calculates the subject acceleration by dividing the difference between two pieces of speed information (e.g., the pieces of speed information 9041, 9042) (difference information) by the difference between corresponding two pieces of speed and time information (e.g., the pieces of speed and time information 9031, 9032) (difference information), and holds the calculated subject acceleration.

The learning correction unit 2113 and the learned model adjustment unit 2114 act similarly to the case where the images and the speeds are learned in association with each other. In this way, the acceleration after a predetermined delay period can be predicted from one image.

Furthermore, regarding the learned model, it is permissible to hold a general-purpose learned model (e.g., a model that has performed learning about dogs in general) at the time of factory shipment, and a learned model specialized in a specific subject may be generated by performing learning about the aforementioned specific subject on each user's side. In this way, the speed after a predetermined delay period can be predicted from one image, even when learning about the specific subject is insufficient.

Furthermore, while learning of the learned model may be repeatedly performed constantly while the power switch is ON, this learning is to be performed repeatedly when the instruction switch SW1 is ON during halfway depression of the shutter button, or when the instruction switch SW2 is on during full depression of the shutter button. This increases the probability that a specific subject that the user wishes to shoot is in the angle of view, thereby enabling learning to be performed efficiently. Also, as another example, the timing at which learning of the learned model is performed may be, for example, while the eye proximity detection sensor 115 is ON, or during a predetermined period that follows a touch operation performed on the touchscreen.

Furthermore, when the motion of the camera is large due to a camera shake and the like, there is a possibility that the subject speed cannot be obtained in a correct way; thus, if a signal obtained when the motion of the camera is large is used in learning, there is a possibility that learning of the learned model becomes incorrect. For this reason, when the acceleration sensor inside the motion sensor 110 has output a signal indicating that the motion of the camera is large, learning of the learned model may be stopped.

As described above, by estimating the speed that a subject will have at the time of image capture that will take place after a predetermined period and selecting a corresponding program line chart, image capturing conditions that are not likely to cause subject blur can be set irrespective of a change in the state of the subject.

Note that in the present embodiment, too, the program line chart for the follow shot is used in a case where the follow shot is performed; as the operations for the case where the follow shot is performed are similar to the operations shown in FIG. 7 of the first embodiment, a description thereof is omitted.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-097832, filed Jun. 4, 2020, and No. 2020-130770, filed Jul. 31, 2020 which are hereby incorporated by reference herein in their entirety.

What is claimed is:

1. An apparatus, comprising:
a capturing device configured to capture an image of a subject;
at least one processor; and
a memory coupled to the at least one processor, the memory having instructions that, when executed by the processor, performs operations as:
an estimation unit configured to estimate, from the captured image, a speed of the subject at a time point of image capture of a subsequent image, the estimation being performed using a learned model generated through machine learning, and
a control unit configured to, based on the estimated speed of the subject, select one program line chart from a plurality of program line charts generated beforehand and determine image capturing parameters for the image capture of the subsequent image by the capturing device based on the selected one program line chart.

2. The apparatus according to claim 1,
wherein the estimation unit estimates the speed of the subject at the time point of the image capture of the subsequent image from an image of the subject that has been captured in a live-view operation.

3. The apparatus according to claim 1,
wherein the control unit controls the capturing operation of the capturing device by switching among the plurality of program line charts for deciding on a diaphragm value, a shutter speed, and an ISO film speed for the image capture of the subsequent image.

4. The apparatus according to claim 1, wherein the at least one processor further performs operations as
a correction unit configured to correct the estimated speed in accordance with a size of the subject on an image surface.

5. The apparatus according to claim 1, further comprising:
an angular velocity sensor configured to detect an angular velocity of the apparatus; and
an acceleration sensor configured to detect acceleration,
wherein the control unit controls the capturing operation for the image capture of the subsequent image further based on outputs from the angular velocity sensor and the acceleration sensor.

6. The apparatus according to claim 5,
wherein the control unit calculates a relative speed of the subject and the apparatus based on the estimated speed and a speed of the apparatus that has been calculated based on the output from the angular velocity sensor and the output from the acceleration sensor.

7. The apparatus according to claim 6,
wherein the control unit determines that a follow shot has been performed when the relative speed is lower than a first threshold and the speed of the apparatus is equal to or higher than a second threshold.

8. The apparatus according to claim 7,
wherein when the control unit has determined that the follow shot has been performed, the control unit decides on a diaphragm value, a shutter speed, and an ISO film speed for the image capture of the subsequent image with use of a program line chart for the follow shot.

9. The apparatus according to claim 1,
wherein the control unit controls a frame rate of live view based on the estimated speed.

10. The apparatus according to claim 9,
wherein the control unit performs control so that the frame rate of live view is higher when the estimated speed is high than when the estimated speed is low.

11. The apparatus according to claim 1,
wherein the control unit switches among methods for obtaining a high-dynamic-range signal based on the estimated speed.

12. The apparatus according to claim 11,
wherein the control unit uses a gain switching method as a method for obtaining the high-dynamic-range signal when the estimated speed is equal to or higher than a third threshold, and uses an accumulation period switching method as the method for obtaining the high-dynamic-range signal when the estimated speed is lower than the third threshold.

13. The apparatus according to claim 1,
wherein the estimation unit further estimates acceleration of the subject.

14. The apparatus according to claim 1,
wherein the estimation unit estimates a speed of the subject at time of a midpoint of an accumulation period of the capturing device, and the control unit controls the capturing operation based on the estimated speed at the time of the midpoint of the accumulation period.

15. The apparatus according to claim 1, wherein the at least one processor further performs operations as
an extraction unit configured to extract a specific subject from at least two images that have been shot at different times by the capturing device, and
a calculation unit configured to calculate a speed of the extracted specific subject,
wherein the learned model further performs learning for speed estimation with use of an image of the extracted specific subject and the speed of the calculated specific subject.

16. The apparatus according to claim 15,
wherein the calculation unit calculates a speed of the specific subject in an angle-of-view direction from difference information of positions of the specific subject that has been extracted by the extraction unit from the at least two images, calculates a speed of the specific subject in a normal direction from an amount of movement of a plurality of characteristic points of the specific subject, and calculates the speed of the specific subject with use of the speed in the angle-of-view direction and the speed in the normal direction.

17. The apparatus according to claim 15, wherein the at least one processor further performs operations as
a second correction unit configured to correct the calculated speed.

18. The apparatus according to claim 17,
wherein the second correction unit corrects the speed in accordance with a subject size on an image surface.

19. The apparatus according to claim 17,
wherein the second correction unit corrects the speed based on an image capture magnification factor of a lens that is used.

20. The apparatus according to claim 17,
wherein the second correction unit corrects the speed based on ranging information from the capturing device.

21. The apparatus according to claim 15, further comprising
a shutter button,
wherein the learned model further performs learning for speed estimation while the shutter button is depressed halfway or fully depressed.

22. The apparatus according to claim 15, further comprising:
a viewfinder; and
a proximity sensor,
wherein the learned model further performs learning for speed estimation while the proximity sensor is detecting an object that is in proximity to the viewfinder.

23. The apparatus according to claim 15, further comprising
a touchscreen,
wherein the learned model further performs learning for speed estimation during a fixed period since detection of a touch operation performed on the touchscreen.

24. The apparatus according to claim 1,
wherein the estimation unit further includes a second learned model that estimates acceleration of the subject after a predetermined period.

25. A method of controlling an apparatus including a capturing device that captures an image of a subject, the method comprising:
estimating, with use of a learned model generated through machine learning, from the image of the captured subject, a speed of the subject at a time point of image capture of a subsequent image; and
selecting, based on the estimated speed of the subject estimated in the estimating, one program line chart from a plurality of program line charts generated beforehand and determining image capturing parameters for the image capture of the subsequent image by the capturing device based on the selected one program line chart.

26. A non-transitory computer-readable storage medium that stores a program for causing a computer to execute a method for an apparatus including a capturing device that captures an image of a subject, the method comprising:
estimating, with use of a learned model generated through machine learning, from the captured image of the subject, a speed of the subject at a time point of image capture of a subsequent image; and
selecting, based on the estimated speed of the subject, one program line chart from a plurality of program line charts generated beforehand and determining image capturing parameters for the image capture of the subsequent image by the capturing device based on the selected one program line chart.

27. The apparatus according to claim 1,
wherein the plurality of program line charts is prepared for respective types of movement.

28. The apparatus according to claim 27,
wherein the plurality of program line charts is prepared for a motionless subject, a low-speed moving subject, intermediate-speed moving subject and high-speed moving subject respectively.

29. The apparatus according to claim 1,
wherein the estimation unit estimates a speed of the subject from a single image.

30. The apparatus according to claim 29,
wherein the estimation unit estimates the speed of the subject from a posture information of a specific subject in the single image.

31. The apparatus according to claim 30,
wherein the learned model has been learned a relationship between the posture information of the specific subject and the speed of the specific subject.

32. The method according to claim 25,
wherein the estimating estimates the speed of the subject at the time point of the image capture of the subsequent image from an image of the subject that has been captured in a live-view operation.

33. The method according to claim 25,
wherein the controlling controls the capturing operation of the capturing device by switching among the plurality of program line charts for deciding on a diaphragm value, a shutter speed, and an ISO film speed for the image capture of the subsequent image.

34. The method according to claim 25, further comprising:
correcting the estimated speed in accordance with a size of the subject on an image surface.

35. The method according to claim 25,
wherein the estimating estimates a speed of the subject from a single image.

36. The non-transitory computer-readable storage medium according to claim 26,
wherein the estimating estimates the speed of the subject at the time point of the image capture of the subsequent image from an image of the subject that has been captured in a live-view operation.

37. The non-transitory computer-readable storage medium according to claim 26,
wherein the controlling controls the capturing operation of the capturing device by switching among the plurality of program line charts for deciding on a diaphragm value, a shutter speed, and an ISO film speed for the image capture of the subsequent image.

38. The non-transitory computer-readable storage medium according to claim 26, further comprising:
correcting the estimated speed in accordance with a size of the subject on an image surface.

39. The non-transitory computer-readable storage medium according to claim 25,
wherein the estimating estimates a speed of the subject from a single image.

\* \* \* \* \*